United States Patent
Wakita

(10) Patent No.: US 9,787,817 B2
(45) Date of Patent: Oct. 10, 2017

(54) COMMUNICATION SYSTEM AND CONTROL DEVICE

(71) Applicant: HONDA MOTOR CO., LTD., Tokyo (JP)

(72) Inventor: Kazuyoshi Wakita, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/352,730

(22) Filed: Nov. 16, 2016

(65) Prior Publication Data

US 2017/0149950 A1    May 25, 2017

(30) Foreign Application Priority Data

Nov. 20, 2015  (JP) ................................ 2015-228124

(51) Int. Cl.
| | |
|---|---|
| *H04M 1/725* | (2006.01) |
| *H04B 1/3822* | (2015.01) |
| *H04W 12/12* | (2009.01) |

(52) U.S. Cl.
CPC ...... *H04M 1/72527* (2013.01); *H04B 1/3822* (2013.01); *H04W 12/12* (2013.01)

(58) Field of Classification Search
CPC ............ H04M 1/72527; H04M 1/6091; H04B 1/3822; H04W 12/12; B60R 11/0216
USPC ....................................................... 455/557
See application file for complete search history.

(56) References Cited

U.S. PATENT DOCUMENTS

| | | | | |
|---|---|---|---|---|
| 6,819,986 B2* | 11/2004 | Hong | ................. | B60R 25/2081 340/439 |
| 6,962,145 B2* | 11/2005 | Akao | ................. | F02D 41/0052 123/568.11 |
| 7,178,069 B2* | 2/2007 | Hashimoto | ......... | G06F 11/0736 701/1 |
| 8,660,149 B2* | 2/2014 | Ando | .................... | H04J 3/0652 370/503 |
| 8,947,117 B2* | 2/2015 | Yanagishima | ......... | H03K 17/61 324/73.1 |
| 9,508,199 B2* | 11/2016 | Bai | ........................ | G07C 5/008 |
| 9,600,005 B2* | 3/2017 | Hayashi | .................... | G05F 1/56 |
| 9,628,617 B2* | 4/2017 | Joh | ................... | H04M 3/42178 |
| 9,632,135 B2* | 4/2017 | Yanagishima | ......... | H03K 17/61 |
| 2002/0177928 A1* | 11/2002 | Moriguchi | .......... | H04M 1/6091 701/1 |

(Continued)

FOREIGN PATENT DOCUMENTS

JP          2014-011621 A        1/2014

*Primary Examiner* — Hai V Nguyen

(74) *Attorney, Agent, or Firm* — Drinker Biddle & Reath LLP

(57) ABSTRACT

A communication system includes a first device configured to transmit a signal to each of a first transmission path and a second transmission path provided within a vehicle, a control device configured to control an in-vehicle device on the basis of the signal transmitted to the second transmission path and transmit a signal indicating a result of control to a third transmission path, and a second device configured to detect a fraud state in the vehicle by performing a comparison on the basis of first information included in the signal received from the first transmission path and second information included in the signal received from the third transmission path.

20 Claims, 23 Drawing Sheets

(56) References Cited

U.S. PATENT DOCUMENTS

| | | | |
|---|---|---|---|
| 2003/0069673 A1* | 4/2003 | Hong | B60R 25/2081 701/33.3 |
| 2004/0045541 A1* | 3/2004 | Akao | F02D 41/0065 123/690 |
| 2004/0206074 A1* | 10/2004 | Akao | F02D 41/0052 60/324 |
| 2005/0153758 A1* | 7/2005 | Broussard | H04M 1/6075 455/575.9 |
| 2008/0004760 A1* | 1/2008 | Sogihara | B60L 3/0076 701/22 |
| 2009/0265100 A1* | 10/2009 | Murakami | G01C 21/26 701/36 |
| 2009/0312898 A1* | 12/2009 | Hashimoto | G05B 19/0428 701/29.1 |
| 2011/0009107 A1* | 1/2011 | Guba | G08G 1/20 455/418 |
| 2011/0128855 A1* | 6/2011 | Ando | H04J 3/0652 370/236 |
| 2011/0160951 A1* | 6/2011 | Ishigooka | G07C 3/02 701/31.4 |
| 2012/0046046 A1* | 2/2012 | Momiyama | G01C 21/20 455/456.1 |
| 2012/0212251 A1* | 8/2012 | Yanagishima | H03K 17/61 324/762.01 |
| 2012/0329520 A1* | 12/2012 | Akama | G01C 21/3688 455/557 |
| 2014/0365839 A1* | 12/2014 | Iwagami | G01B 31/318544 714/727 |
| 2015/0046022 A1* | 2/2015 | Bai | G07C 5/008 701/31.5 |
| 2015/0084777 A1* | 3/2015 | Haber | G01F 17/00 340/635 |
| 2015/0137843 A1* | 5/2015 | Yanagishima | H03K 17/61 324/750.3 |
| 2015/0205314 A1* | 7/2015 | Hayashi | G05F 1/56 323/217 |
| 2015/0224891 A1* | 8/2015 | Petrosian | B60L 11/1851 701/31.4 |
| 2016/0001781 A1* | 1/2016 | Fung | G06F 19/345 701/36 |
| 2016/0014273 A1* | 1/2016 | Joh | B60R 16/0373 455/563 |
| 2016/0077125 A1* | 3/2016 | Buck | G01C 21/16 73/1.38 |
| 2016/0230883 A1* | 8/2016 | Tsuchida | F16H 61/12 |
| 2016/0268799 A1* | 9/2016 | Urase | H02P 7/06 |
| 2016/0272197 A1* | 9/2016 | Hulten | B62D 6/003 |
| 2017/0075678 A1* | 3/2017 | Kurosawa | B60R 16/02 |

* cited by examiner

COMMUNICATION SYSTEM AND CONTROL DEVICE

CROSS-REFERENCE TO RELATED APPLICATIONS

Priority is claimed on Japanese Patent Application No. 2015-228124, filed Nov. 20, 2015, the content of which is incorporated herein by reference.

BACKGROUND OF THE INVENTION

Field of the Invention

The present invention relates to a communication system and a control device.

Description of Related Art

In recent years, communication systems in which a plurality of control devices provided within a vehicle perform communication via a network within the vehicle and control various types of control target in the vehicle have been provided. In these communication systems, a plurality of paths may be configured to be provided.

Technology for reducing an influence of fraudulent behavior when fraudulent behavior is performed in the network is known (for example, see Japanese Unexamined Patent Application, First Publication No. 2014-11621 (hereinafter, Patent Document 1)). In the above-described technology, a communication message is determined to be abnormal when an own device receives a communication message to which identification information to be transmitted by the own device is attached.

SUMMARY OF THE INVENTION

However, according to Patent Document 1, in addition to the communication message to which the identification information to be received by the own device is attached, a communication message to which the identification information to be transmitted by the own device or the like is also received. In this technology, the number of receptions of the communication message for detecting the state increases and processing is complex. In a communication system which receives messages from a plurality of paths, there is a problem in that the number of paths increases and a process for detecting a fraud state in the network is complex.

An aspect according to the present invention has been made in view of the circumstances and an objective of the aspect is to provide a communication system and a control device capable of protecting a control device from fraudulent behavior in a network according to a simpler configuration.

To achieve the above-described objective, the present invention adopts the following aspects.

(1) According to an aspect of the present invention, a communication system includes: a first device configured to transmit a signal to each of a first transmission path and a second transmission path provided within a vehicle; a control device configured to control an in-vehicle device on the basis of the signal transmitted to the second transmission path and transmit a signal indicating a result of control to a third transmission path; and a second device configured to detect a fraud state in the vehicle by performing a comparison on the basis of first information included in the signal received from the first transmission path and second information included in the signal received from the third transmission path.

(2) In aspect (1), the first device may transmit a signal including predetermined third information to the second transmission path and transmit a signal including the first information different from the third information to the first transmission path, the control device may convert the third information into the second information, and the second device may determine that a state is in the fraud state when the first information and the second information are different beyond a predetermined degree.

(3) In aspect (1), the first device may transmit a signal including common information to the first transmission path and the second transmission path, and the second device may generate predicted information by predicting original information serving as a basis from which the second information is generated through conversion by the control device on the basis of the second information and determine that the state is in the fraud state at least when the first information and the predicted information are different beyond a predetermined degree or when information obtained by performing the same conversion as the conversion on the first information and the second information are different beyond a predetermined degree.

(4) According to an aspect of the present invention, a communication system includes: a first device configured to transmit a signal for a control device to each of a first transmission path and a second transmission path provided within a vehicle; a first control device configured to control an in-vehicle device on the basis of the signal transmitted to the first transmission path and transmit a first signal indicating a result of control to a third transmission path; a second control device configured to control the in-vehicle device on the basis of the signal transmitted to the second transmission path and transmit a second signal indicating a result of control to a fourth transmission path; and a second device configured to detect a fraud state in the vehicle by performing a comparison on the basis of first information included in the first signal received from the third transmission path and second information included in the second signal received from the fourth transmission path.

(5) In aspect (4), the first device may transmit a signal including common information to the first transmission path and the second transmission path, and the second device may determine that the state is in the fraud state at least when an estimated value of first original information serving as a basis from which the first information is generated by the first control device is determined on the basis of the first information, second predicted information capable of being generated by the second control device is determined on the basis of the estimated value of the first original information, and the second information and the second predicted information are different beyond a predetermined degree, when an estimated value of second original information serving as a basis from which the second information is generated by the second control device is determined on the basis of the second information, first predicted information capable of being generated by the first control device is determined on the basis of the estimated value of the second original information, and the first information and the first predicted information are different beyond a predetermined degree, or when the estimated value of the first original information serving as the basis from which the first information is generated by the first control device is determined on the basis of the first information, the estimated value of the second original information serving as the basis from which the second information is generated by the second control device on the basis of the second information is determined, and the first original information and the second original information are different beyond a predetermined degree.

(6) In aspect (4), the first device and the second device may have a correspondence table in which other information is defined in a predetermined range if the first device determines third information to be transmitted to the first transmission path or fourth information to be transmitted to the second transmission path, and the second device may determine that the state is in the fraud state at least when an estimated value of first original information serving as a basis from which the first information is generated by the first control device is determined on the basis of the first information, a converted value obtained by referring to the correspondence table is determined on the basis of the estimated value of the first original information, second predicted information capable of being acquired by the second control device performing conversion is determined on the basis of the determined converted value, and the second information and the second predicted information are different beyond a predetermined degree, when an estimated value of second original information serving as a basis from which the second information is generated by the second control device is determined on the basis of the second information, a converted value obtained by referring to the correspondence table is determined on the basis of the estimated value of the second original information, first predicted information capable of being acquired by the first control device performing conversion is determined on the basis of the determined converted value, and the first information and the first predicted information are different beyond a predetermined degree, or when the estimated value of the first original information serving as the basis from which the first information is generated by the first control device is determined on the basis of the first information, the estimated value of the second original information serving as the basis from which the second information is generated by the second control device on the basis of the second information is determined, and the first original information and the second original information are not in a correspondence relationship of the correspondence table.

(7) In any one of aspects (4) to (6), the fourth transmission path may be the same as the second transmission path.

(8) In any one of aspects (4) to (7), the third transmission path may be the same as the fourth transmission path.

(9) In any one of aspects (1) to (8), the third transmission path may be the same as the first transmission path.

(10) In any one of aspects (1) to (9), at least a signal transmitted by the first device may include transmission source information of the signal.

(11) In any one of aspects (1) to (10), the second device may perform the comparison after aligning dimensions of information to be compared.

(12) In any one of aspects (1) to (11), the control device may perform conversion into the second information by combining other additional information.

(13) In any one of aspects (1) to (12), the second device may determine that the state is in the fraud state if a predetermined correlation is not recognized between the first information included in the received signal and the second information included in the received signal.

(14) In any one of aspects (1) to (13), the second device may control a function of the vehicle to be executed by the in-vehicle device corresponding to the second device on the basis of one or both of the first information and the second information.

(15) In any one of aspects (1) to (14), hardware which executes a function of the vehicle and a sensor which acquires a control response of the hardware may be associated in the control device, and the control device may designate the control response acquired by the sensor by controlling the hardware with a control instruction value included in the signal received from the second transmission path as the second information.

(16) In aspect (15), the hardware may include any of a drive device, a transmission, and an instrument.

(17) In any one of aspects (1) to (16), the second device may determine that the state is in the fraud state by determining that a fraud device spoofing the first device exists.

(18) In any one of aspects (1) to (17), at least one of the first device, the second device, and the control device may have a function of relaying communication between two or more different transmission paths.

(19) In any one of aspects (1) to (18), the control device may transmit information indicating a malfunction when a malfunction occurs in the control device and the second device may determine that the state is in the fraud state by determining that the malfunction has occurred in the control device if the information indicating the malfunction is received and determining that a fraud device spoofing the first device exists if the information indicating the malfunction is not received.

(20) In any one of aspects (1) to (19), a rule for generating the second information may be shared with the first device or the second device.

According to an aspect according to the present invention, it is possible to protect a control device from fraudulent behavior in a network according to a simpler configuration by transmitting a signal to each of a first transmission path and a second transmission path provided within a vehicle, controlling an in-vehicle device on the basis of the signal transmitted to the second transmission path, transmitting a signal indicating a result of control to a third transmission path, and detecting a fraud state in the vehicle by performing a comparison on the basis of first information included in the signal received from the first transmission path and second information included in the signal received from the third transmission path.

DETAILED DESCRIPTION OF THE INVENTION

Hereinafter, embodiments of a communication system, a transmission device, and a communication method of the present invention will be described with reference to the drawings.

First Embodiment

Figure 1:
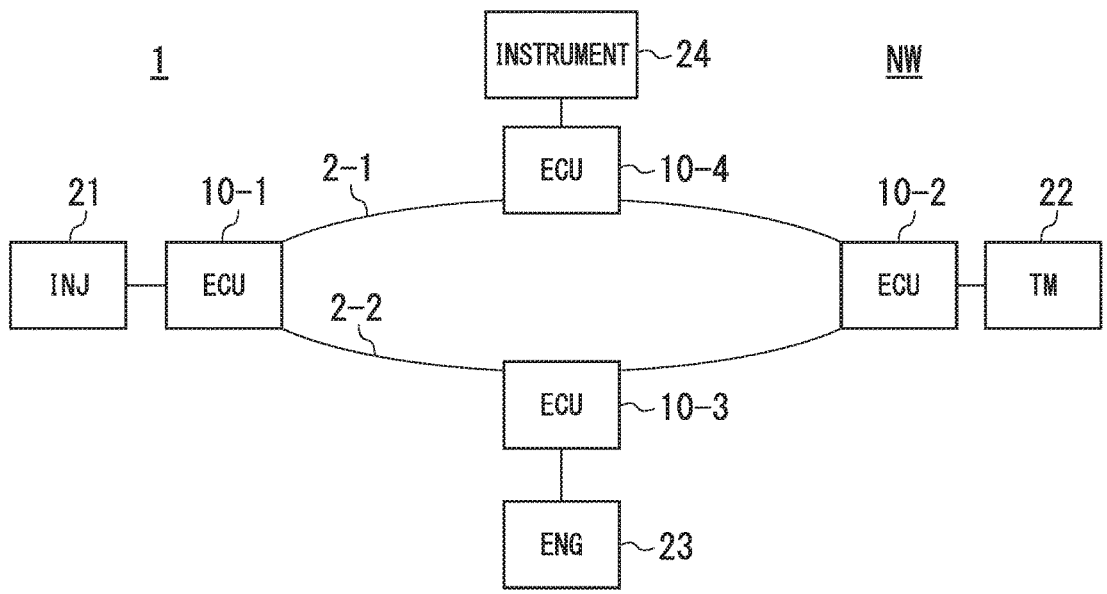
FIG. 1 is a diagram illustrating a configuration of a communication system of a first embodiment.

In a communication system 1 of the embodiment, a first device transmits signals including the same information to a plurality of transmission paths, a signal of one transmission path is converted, and a second device compares the signals received from the plurality of transmission paths. FIG. 1 is a diagram illustrating a configuration of the communication system 1 of the present embodiment. The communication system 1 is, for example, provided in a vehicle. The communication system 1 constitutes a network NW including at least a bus 2-1 (a first transmission path) and a bus 2-2 (a second transmission path) within the vehicle. The bus 2-1 and the bus 2-2 of the embodiment form transmission paths different from each other. Mutually different transmission paths of the embodiment are physically connected to each other as in the bus 2-1 and the bus 2-2. In the communication system 1, for example, communication based on a controller area network (CAN) is performed via the network NW.

The communication system 1 includes an ECU 10-1 (the first device), an ECU 10-2 (the second device), an ECU 10-3 (a control device), and an ECU 10-4. The ECU 10-1 and the ECU 10-2 are connected to the bus 2-1 and the bus 2-2. The ECU 10-3 is connected to the bus 2-2 and the ECU 10-4 is connected to the bus 2-1. Hereinafter, when the ECU 10-4 is not distinguished from the ECU 10-1, they are simply written as the ECU 10. Unless stated particularly, the ECU 10 is connected to at least one of the common buses 2-1 and 2-2. Hereinafter, when the bus 2-1 and the bus 2-2 are not distinguished, they are simply written as the bus 2. When the plurality of transmission paths of the buses 2 are indicated, they may be simply referred to as a plurality of transmission paths. For example, the ECU 10 transmits a signal to the bus 2 and a signal transmitted from another ECU 10 connected to the same bus 2 to the bus 2 is received.

The ECU 10 transmits a signal to the network NW to which its own device belongs and receives a signal transmitted to the network NW. When desired data is transmitted via the network NW, the ECU 10 transmits a signal in units of messages. The message is an example of a signal. Hereinafter, each message to be communicated via the network NW is referred to as a message M. The message M forms a predetermined frame and is identified according to an identifier (hereinafter referred to as an ID) attached as management information of a frame. The ECU 10 maintains an ID (hereinafter referred to as a registered ID) for identifying the message M to be received by the own ECU 10.

The ECU 10 extracts and acquires the message to which the ID having the same value as the registered ID is attached from among received messages M. When a notification of predetermined information is provided without transmitting desired data via the network NW, the ECU 10 transmits a signal corresponding to the above-described predetermined information without forming a message as a unit. In this case, the signal also includes a signal of a result of converting information into a specific code, a signal of a predetermined voltage, a no-signal, or the like.

As illustrated in FIG. 1, control targets 20 (hardware) which are various types of in-vehicle device are associated with the ECUs 10. In the example illustrated in FIG. 1, as an in-vehicle device corresponding to the ECU 10, for example, a fuel injection device (INJ) 21 is associated with the ECU 10-1, a transmission (TM) 22 is associated with the ECU 10-2, an engine (ENG) 23 is associated with the ECU 10-3, and the instrument 24 is associated with the ECU 10-4. The fuel injection device 21, the transmission 22, the engine 23, and the instrument 24 are examples of the in-vehicle devices. In an example illustrated in FIG. 1, the engine 23 receives supply of fuel from the fuel injection device 21 and obtains an output by burning vaporized fuel. This engine 23 is an example of a drive device. An output of the engine 23 is supplied to the transmission 22 via its shaft. The transmission 22 converts a rotational speed Ne of the shaft of the engine 23 into a predetermined rotational speed. For example, the transmission 22 drives drive wheels of the vehicle by the rotational speed after the conversion.

The illustrated control targets 20 become a combination in which their control states are mutually related. A plurality of ECUs 10 for controlling the control targets 20 required to drive the vehicle are provided in correspondence with the control targets 20 and functions for controlling the control targets 20 may be distributed and allocated to the ECUs 10.

For example, when the network NW is configured as illustrated in FIG. 1 and information is transmitted from the ECU 10-1 to another ECU 10, the ECU 10-1 transmits a signal such as a control instruction to the ECU 10-2 in a plurality of paths of the bus 2-1 and the bus 2-2. Also, the ECU 10-3 and the ECU 10-4 may transmit information to be transmitted from the ECU 10-1 to the ECU 10-2 by relaying the information via a device of another ECU. In the present embodiment, the case in which the ECU 10-3 relays the information will be described.

First, common points between the ECUs 10 will be mainly described and individual description of each ECU 10 will be described below.

Figure 2:
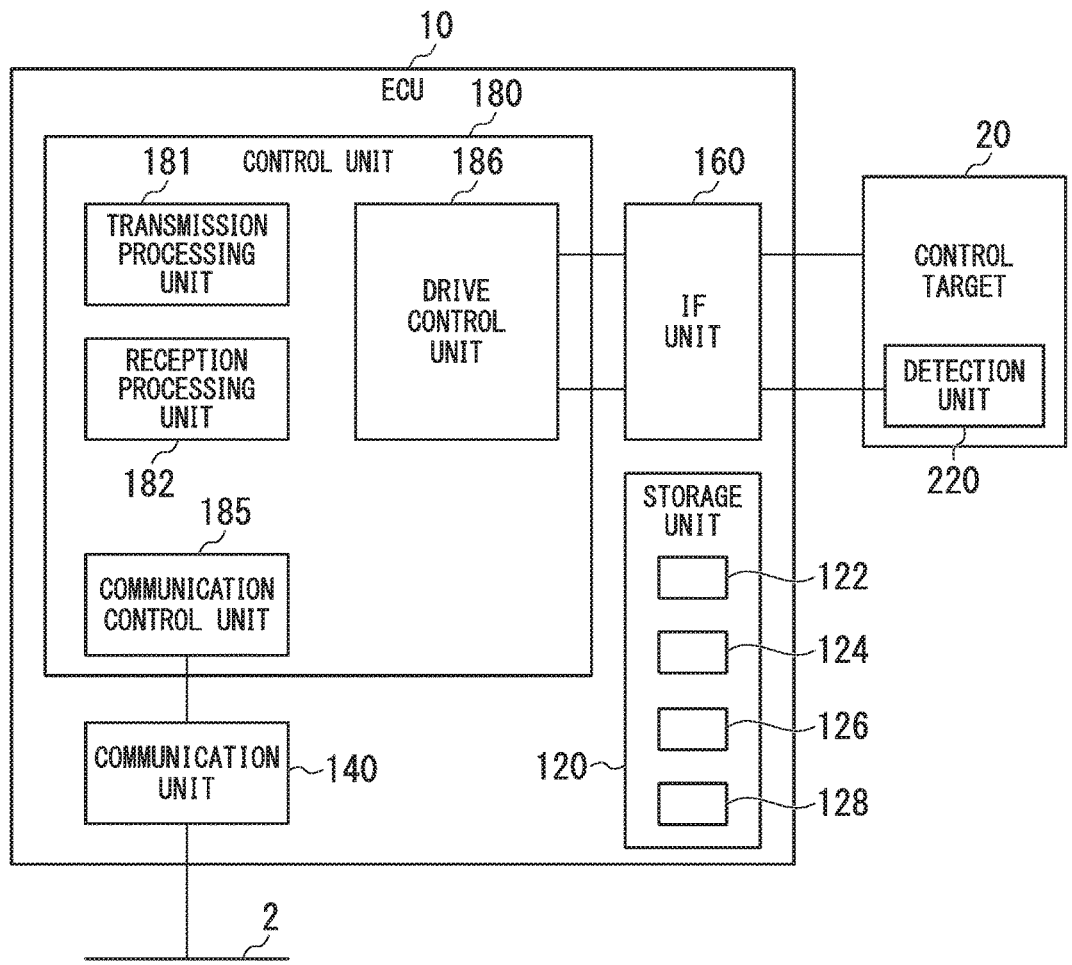
FIG. 2 is a diagram illustrating a configuration example of an ECU of the present embodiment.

FIG. 2 is a diagram illustrating a configuration example of the ECU 10. The ECU 10 includes, for example, a storage unit 120, a communication unit 140, an IF unit 160, and a control unit 180. The control unit 180 includes, for example, a processor such as, for example, a central processing unit (CPU).

The storage unit 120 is implemented by, for example, a nonvolatile storage device such as a read only memory (ROM), an electrically erasable and programmable read only memory (EEPROM), or a hard disk drive (HDD) and a volatile storage device such as a register. The storage unit 120 stores an application program 122, a program such as a communication control program 124, and various types of information to be referred to by the above-described program. Also, the storage unit 120 includes a transmission buffer 126 and a reception buffer 128. The transmission buffer 126 stores data to be included in the message M and transmitted from the ECU 10. The reception buffer 128 stores data included in the message M received by the ECU 10. Also, the storage unit 120 stores, for example, an ID table in which an ID of the message M to be transmitted/received via the network NW is stored and the like as various types of information. The ID of the message M includes information indicating a transmission source, a transmission destination, a type of the message M, etc. Also, the storage unit 120 stores a transmission schedule of messages M to be transmitted to the network NW and priority information indicating a priority of a message M.

Also, the storage unit 120 may store a conversion rule for defining an information conversion method or the like.

Also, if the ECU 10 receives a message, a condition for determining that there is a message to be paired is predetermined and its information may be stored in the storage unit 120. The determination condition may include information related to a combination of transmission sources, a permitted value of the difference between times at which messages are received, etc.

The application program 122 may include a program for performing information processing allocated to each ECU 10. For example, the application program 122 may include a program for controlling various types of functional unit provided in the vehicle, a program for relaying communication via a network NW, a program for controlling communication of the network NW, etc. The communication control program 124 is a program for performing a communication process by controlling the communication unit 140 in response to a request from the application program 122. The communication control program 124 is configured to perform a communication process of a layer of a lower level than that of a communication process to be performed by the application program 122 if it is corresponds to a layer of a communication protocol.

The communication unit 140 is connected to the bus 2 and is an interface for performing communication via the bus 2. For example, the communication unit 140 includes a CAN controller, a driver, etc., functions as a transmission unit which transmits a message M according to control of the communication control unit 185 or a reception unit which receives a message M, and performs desired communication. The communication unit 140 transmits a message M stacked in the transmission buffer 126. The communication unit 140 stores the message M received from the bus 2 in the reception buffer 128.

The IF unit 160 is an interface which connects the control target 20 and the detection unit 220. The IF unit 160 includes a drive unit which drives the control target 20. The control target 20 indicates various types of hardware associated with the ECU 10. The IF unit 160 supplies information from the detection unit 220 which detects a state of the control target 20 to the control unit 180.

The control unit 180 executes various programs to implement a function in each functional unit. The control unit 180 includes a transmission processing unit 181, a reception processing unit 182, a communication control unit 185, and a drive control unit 186.

The units such as the transmission processing unit 181, the reception processing unit 182, and the drive control unit 186 function by executing the application program 122 and execute control assigned to the ECU 10.

If a message or the like is transmitted from the ECU 10, the transmission processing unit 181 notifies the communication control unit 185 of a transmission request by storing information including a message or the like to be transmitted in the transmission buffer 126. If a message or the like is received from another ECU 10 or the like, the reception processing unit 182 receives a notification when the message or the like is received from the communication control unit 185 and acquires information stored in the reception buffer 128.

The drive control unit 186 determines a control amount for controlling the control target 20 and controls the control target 20. For example, the drive control unit 186 determines the control amount on the basis of information acquired from another ECU 10 or the like by the ECU 10, information detected in the detection unit 220, etc.

The communication control unit 185 functions by executing the communication control program 124, is controlled from the transmission processing unit 181 and the reception processing unit 182, and executes a communication process of the ECU 10.

The communication control unit 185 refers to an ID of the message M received via the communication unit 140 and a registered ID stored in an ID table and determines whether a received message M is a message M including information received by its own device. The communication control unit 185 acquires the information included in the message M and stores the acquired information in the reception buffer 128 if the information received by its own ECU 10 is included in the message M. On the other hand, the communication control unit 185 discards, for example, information of the message M, if information received by its own ECU 10 is not included in the message M. The communication control unit 185 causes the communication unit 140 to transmit the message M. Also, the communication control unit 185 deletes the message stored in the transmission buffer 126 according to transmission of a frame F.

Figure 3:
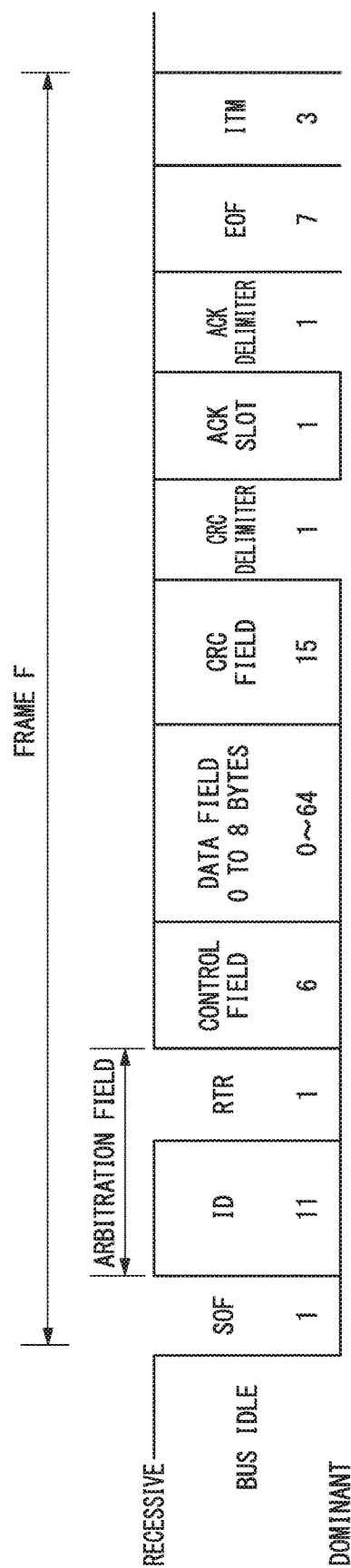
FIG. 3 is a format example of a message M to be transmitted to a bus by an ECU of the present embodiment.

FIG. 3 is a format example of the message M to be transmitted by the ECU 10 to the bus 2. FIG. 3 illustrates a message M to be transmitted in one transmission. The message M includes a start of field (SOF), an arbitration field including a remote transmission request (RTR) for identifying an ID of the message M or the like, a control field indicating the number of bytes of a frame or the like, a data field which is the substance of a message M to be transmitted, a CRC field to which an error detection code (CRC) is added, an ACK slot for receiving a response acknowledgement (ACK), an ACK delimiter, an end of frame (EOF), etc.

The ECU 10 performs communication by allocating control information or the like to the data field.

(Detection of Fraud State)

Figure 4:
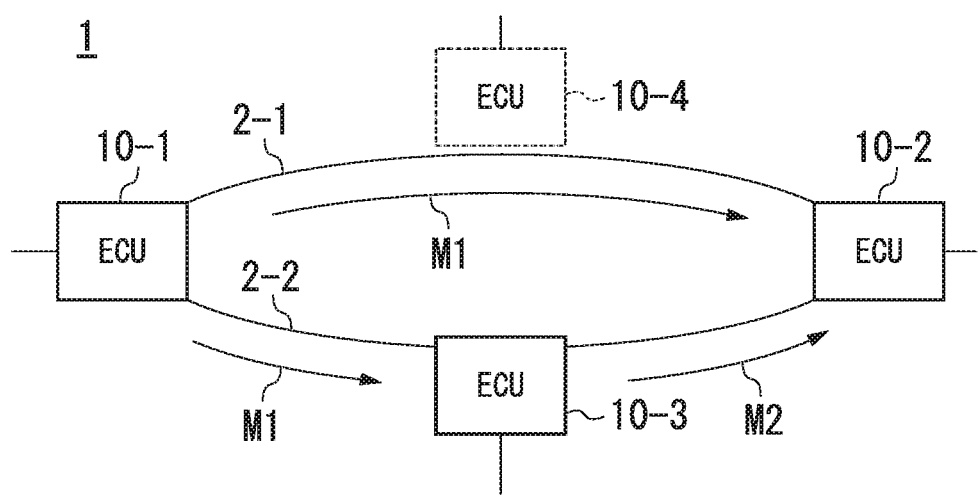
FIG. 4 is a diagram illustrating an example of detection of a fraud state of a communication system of the present embodiment.

FIG. 4 is a diagram illustrating an example of detection of the fraud state of the communication system 1. The ECU 10-1 transmits a message M1 to each of the buses 2-1 and 2-2. Next, the ECU 10-3 controls the engine 23 on the basis of the message M1 (a signal) transmitted to the bus 2-2 and transmits a message M2 (a signal) indicating a result of control to the bus 2-2. Next, the ECU 10-2 receives the message M1 from the bus 2-1, receives the message M2 from the bus 2-2, and performs a comparison on the basis of the messages M1 and M2, thereby detecting the fraud state in the vehicle.

Next, an individual ECU 10 will be described.

(ECU 10-1)

Figure 5:
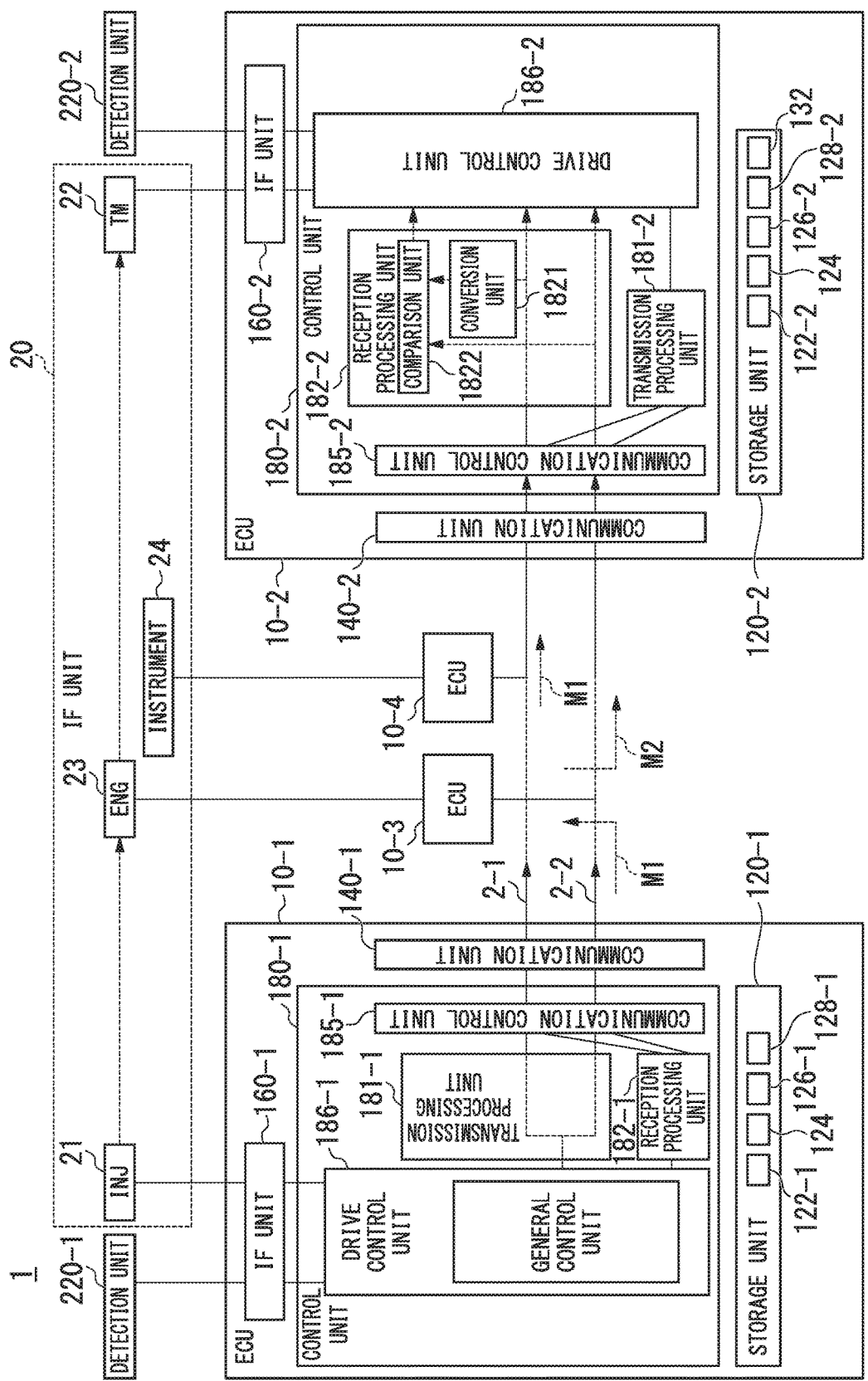
FIG. 5 is a diagram illustrating a configuration example of a communication system of the present embodiment.

FIG. 5 is a diagram illustrating a configuration example of the communication system 1. In FIG. 5, each ECU 10 and the control target 20 connected to the bus 2 are illustrated.

The ECU 10-1 illustrated in FIG. 5 includes, for example, a storage unit 120-1, a communication unit 140-1, an IF unit 160-1, and a control unit 180-1.

The storage unit 120-1 includes an application program 122-1, a transmission buffer 126-1, and a reception buffer 128-1 in place of the application program 122, the transmission buffer 126, and the reception buffer 128 of the storage unit 120.

The application program 122-1 includes a process of controlling the fuel injection device 21 and a process of transmitting a control instruction to another ECU 10. The transmission buffer 126-1 includes transmission buffers independently configured in correspondence with the bus 2-1 and the bus 2-2. The reception buffer 128-1 includes reception buffers independently configured in correspondence with the bus 2-1 and the bus 2-2.

The communication unit 140-1 is connected to each of the bus 2-1 and the bus 2-2. The communication unit 140-1 independently performs communication corresponding to the bus 2-1 and the bus 2-2.

The control unit 180-1 includes a transmission processing unit 181-1, a reception processing unit 182-1, a communication control unit 185-1, and a drive control unit 186-1.

The communication control unit 185-1 independently performs communication processes corresponding to the bus 2-1 and the bus 2-2 to be controlled in addition to the above-described process of the communication control unit 185.

The drive control unit 186-1 controls the fuel injection device 21 such that it injects, for example, a predetermined amount of fuel from the fuel injection device 21. The drive control unit 186-1 further controls the transmission processing unit 181-1 such that it transmits information for controlling the control target 20 provided in correspondence with another ECU 10 to a destination of each ECU 10.

The transmission processing unit 181-1 acquires information to be transmitted to the other ECU 10 in response to an instruction from the drive control unit 186-1 and transmits the message M to the network NW. For example, the transmission processing unit 181-1 generates the message M to be transmitted to the bus 2-1 and the message M to be transmitted to the bus 2-2 and notifies the communication control unit 185-1 of a transmission request after the messages M are stored in the transmission buffer 126-1. If the message M to be transmitted to the bus 2-1 and the message M to be transmitted to the bus 2-2 are transmitted to the ECU 10-2, the transmission processing unit 181-1 transmits the messages M so that the messages M correspond thereto. For example, the transmission processing unit 181-1 performs transmission so that a time difference between transmission times is reduced by causing information included in each message M to correspond thereto. Alternatively, the transmission processing unit 181-1 may transmit the messages M after attaching an identification code indicating that each message M corresponds thereto.

If the message or the like is transmitted to the ECU 10 connected to one bus 2, the transmission processing unit 181-1 transmits a signal to the bus 2 to which the ECU 10 is connected. The transmission processing unit 1814 stores information including a message or the like to be transmitted in the transmission buffer 126-1 corresponding to a transmission path to which an ECU of a transmission destination is connected and notifies the communication control unit 185-1 of a transmission request.

When a message or the like is received from another ECU 10 or the like, the reception processing unit 182-1 receives a notification indicating that the message or the like is received from the communication control unit 185-1 and acquires the information stored in the reception buffer 128-1 in correspondence with a transmission path.

(ECU 10-3)

Figure 6:
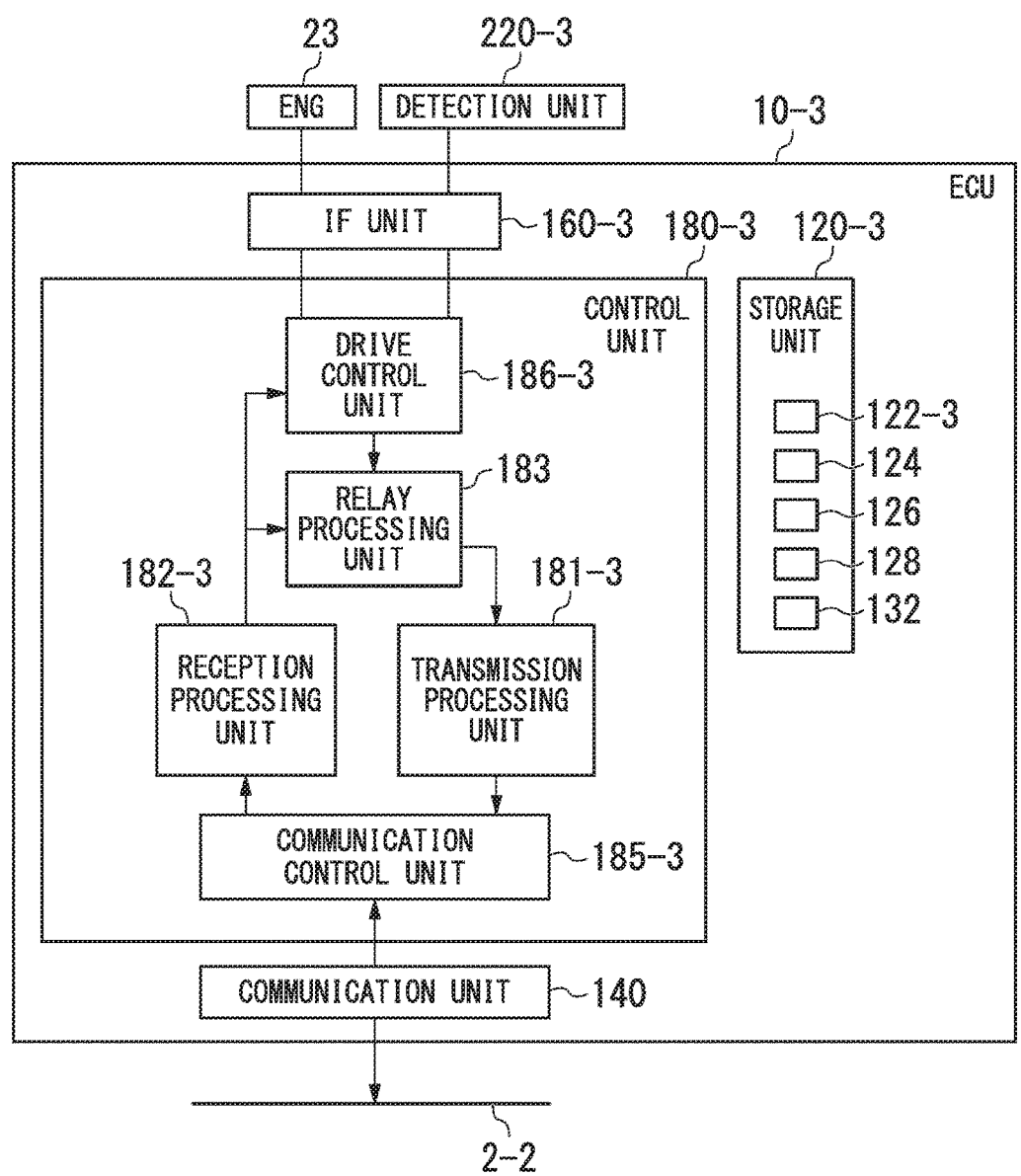
FIG. 6 is a diagram illustrating a configuration example of an ECU of the present embodiment.

FIG. 6 is a diagram illustrating a configuration example of the ECU 10-3. The ECU 10-3 includes, for example, a storage unit 120-3, a communication unit 140, an IF unit 160-3, and a control unit 180-3. The storage unit 120-3 further includes a conversion rule 132 related to a conversion process with respect to the above-described storage unit 120.

The storage unit 120-3 includes an application program 122-3 in place of the application program 122 of the storage unit 120. The application program 122-3 includes a process of controlling the engine 23 and further includes a process of controlling a relay processing unit 183.

The control unit 180-3 includes a transmission processing unit 181-3, a reception processing unit 182, the relay processing unit 183, a communication control unit 185-3, and a drive control unit 186-3.

The reception processing unit 182-3 further receives the message M from the ECU 10-1 and notifies the relay processing unit 183 of information acquisition completion if information is acquired in addition to the above-described process of the reception processing unit 182. The transmission processing unit 181-3 further receives a communication request from the drive control unit 186-3 and the relay processing unit 183 and controls the communication control unit 185-3 such that it transmits the message M in addition to the above-described process of the transmission processing unit 181. The relay processing unit 183 receives the notification from the reception processing unit 182-3 and performs a predetermined conversion process defined by the conversion rule 132 on the basis of information included in the received message M. The relay processing unit 183 generates information indicating a result of the conversion process, supplies the information to the transmission processing unit 181-3, designates a predetermined transmission destination, and causes the information to be transmitted to the predetermined transmission destination.

The conversion rule 132 to be referred to by the relay processing unit 183 will be described.

Input information of the conversion process is information for controlling the in-vehicle device extracted from the message M (the signal) transmitted to the bus 2. For example, the information includes a control instruction value, a numerical value derived by a predetermined calculation from the control instruction value, etc.

Output information of the conversion process is information indicating a result of controlling the control target on the basis of the above-described control instruction information. For example, the information includes a control response value, a numerical value derived by a predetermined calculation from the control result, etc.

If an actual control result cannot be used as output information of the conversion process, a control model in which a numerical value of a property of the control target is generated may be used and a response prediction value for the control instruction value may be defined in a table. For example, the case in which the ECUs 10 to which the actual control target is not connected share the conversion rule or the like is included.

The message M (a second signal) including the above-described output information is generated as the result of the conversion process and the generated message M is transmitted to the same bus 2 as the bus 2 receiving the message M. For example, the ECU 10-3 transmits the message M to the bus 2-2.

For example, the conversion rule 132 is defined as described above.

Also, the above-described conversion rule 132 may be combined with the received information and other information having a type different from that of the received information to generate information to be transmitted.

Figure 7:
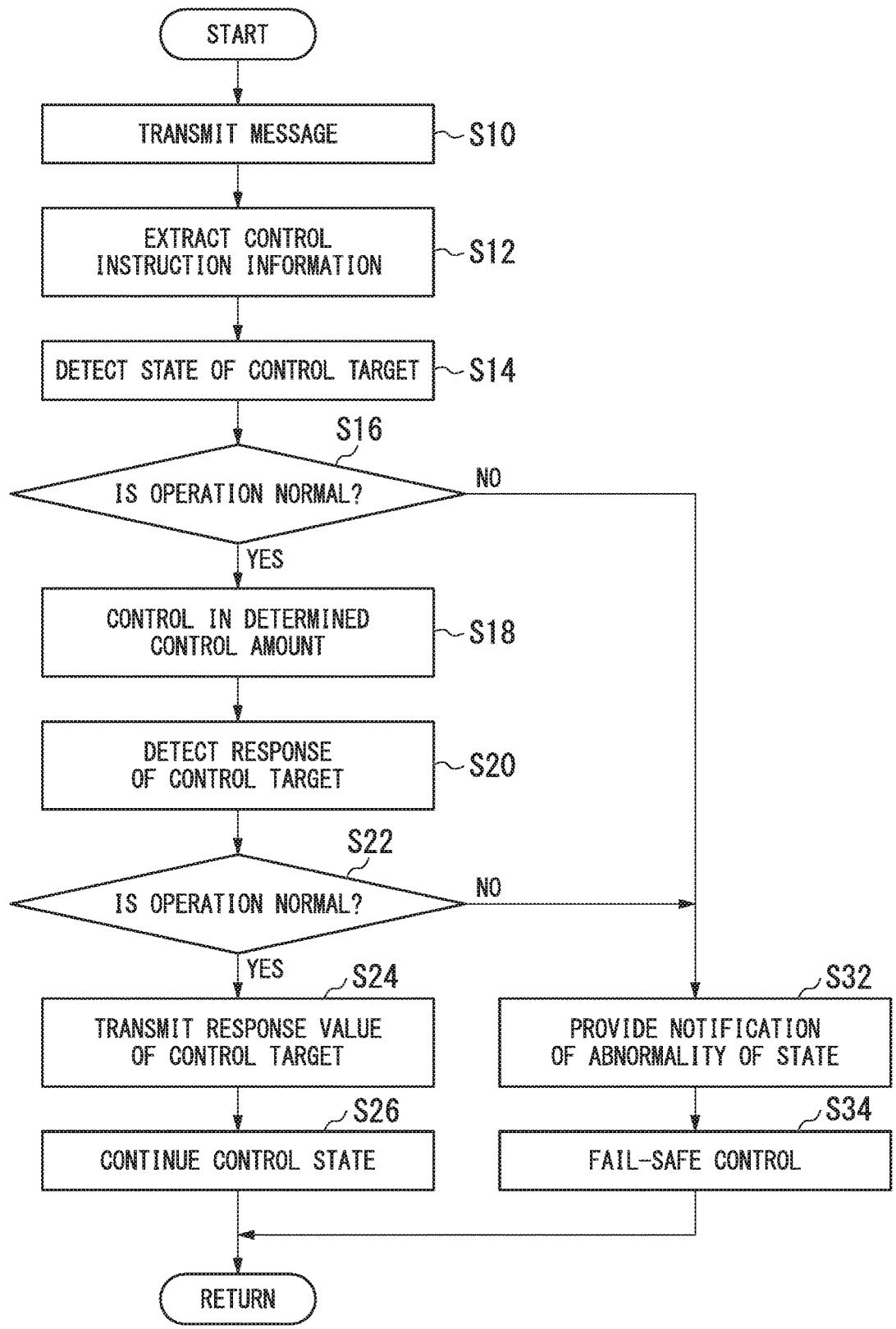
FIG. 7 is a flowchart illustrating an example of a process in the ECU of the present embodiment.

FIG. 7 is a flowchart illustrating an example of a process in the ECU 10-3. The reception processing unit 182 receives a message M1 and a message M2 (S10) and extracts information having a control instruction value from the message M1 and the message M2 (S12). The drive control unit 186 acquires information from the detection unit 220 to detect a state of the control target (S14) and determines the state of the control target (S16).

If it is determined that the state is a normal control state in S16, the drive control unit 186 adjusts a control amount on the basis of the control instruction value extracted in S12 and sensor information acquired in S14 to control the control target (S18). The drive control unit 186 detects a response state of the control target by the detection unit 220 (S20). The drive control unit 186 determines the state of the control target according to the control instruction value, the control amount, the sensor information, etc. (S22). If it is determined that the state is the normal control state in S22, the relay processing unit 183 transmits the control response value detected in S20 (S24). The drive control unit 186 continues the control state (S26) and ends the above process.

On the other hand, if it is determined that the state is not the normal control state in S16 or S22, the relay processing unit 183 transmits a signal (hereinafter referred to as an abnormality notification) for providing the notification of the abnormality of the state (S32). The drive control unit 186 moves the control state of the control target to a fail-safe process (S34) and ends the above-described process.

Returning to FIG. 4, the description of the communication system 1 continues. The above-described ECU 10-1 designates the ECU 10-2 as a transmission destination of the message M1 to be transmitted to the bus 2-1 and designates the ECU 10-3 as a transmission destination of the message M1 to be transmitted to the bus 2-2. Also, the message M1 is assumed to include first information D1 for controlling the engine 23 of the control target 20.

In this case, the ECU 10-3 controls the engine 23 on the basis of first information D1 included in the message M1. Also, the ECU 10-3 performs the conversion process based on the conversion rule 132 for the first information D1 and transmits the message M2 including second information D2 which is a result of the conversion process to the ECU 10-2 designated as a predetermined destination. Also, when a malfunction is detected in the control target, the ECU 10-3 transmits a signal indicating the detection to other ECUs 10 including the ECU 10-2.

(ECU 10-2)

The ECU 10-2 includes, for example, a storage unit 120-2, a communication unit 140-2, an IF unit 160-2, and a control unit 180-2.

Similar to the above-described storage unit 120-1, the storage unit 120-2 includes a transmission buffer 126-2 and a reception buffer 128-2 corresponding to the bus 2-1 and the bus 2-2 and further includes a conversion rule 132.

The communication unit 140-2 is connected to each of the bus 2-1 and the bus 2-2. The communication unit 140-2 independently performs communication corresponding to the bus 2-1 and the bus 2-2.

The control unit 180-2 includes a transmission processing unit 181-2, a reception processing unit 182-2, a communication control unit 185-2, and a drive control unit 186-2.

The transmission processing unit 181-2 performs a process similar to that of the above-described transmission processing unit 181-1 using the transmission buffer 126-2.

If the message M or the like is received from another ECU 10 or the like, the reception processing unit 182-2 receives a notification indicating that there is reception of a message or the like from the communication control unit 185-2 and acquires information stored in the reception buffer 128-2 for each transmission path.

The reception processing unit 182-2 performs a fraud state detection process on the basis of information received from the bus 2-1 and the bus 2-2. For example, the information received from the bus 2-1 and the bus 2-2 by the reception processing unit 182-2 includes the first information D1 included in the message M1 and the second information D2 included in the message M2. The reception processing unit 182-2 performs a comparison based on the first information D1 and the second information D2. The reception processing unit 182-2 detects that a fraud state has occurred in the network NW on the basis of a result of the comparison. The reception processing unit 182-2 performs a predetermined desired process when it is determined that the fraud state has occurred.

The reception processing unit 182-2 of the present embodiment includes a conversion unit 1821 and a comparison unit 1822. The conversion unit 1821 converts at least one of the first information D1 and the second information D2 which are predetermined according to the conversion rule 132. The comparison unit 1822 compares a result after conversion by the conversion unit 1821 with the other information which is not converted by the conversion unit 1821. A configuration illustrated in FIG. 5 shows an example of when the conversion unit 1821 converts the first information D1 according to the conversion rule 132 and the comparison unit 1822 compares the conversion result with the second information D2.

(Fraud State Detection Process)

Next, details of the fraud state detection process of the communication system 1 will be described.

Figure 8:
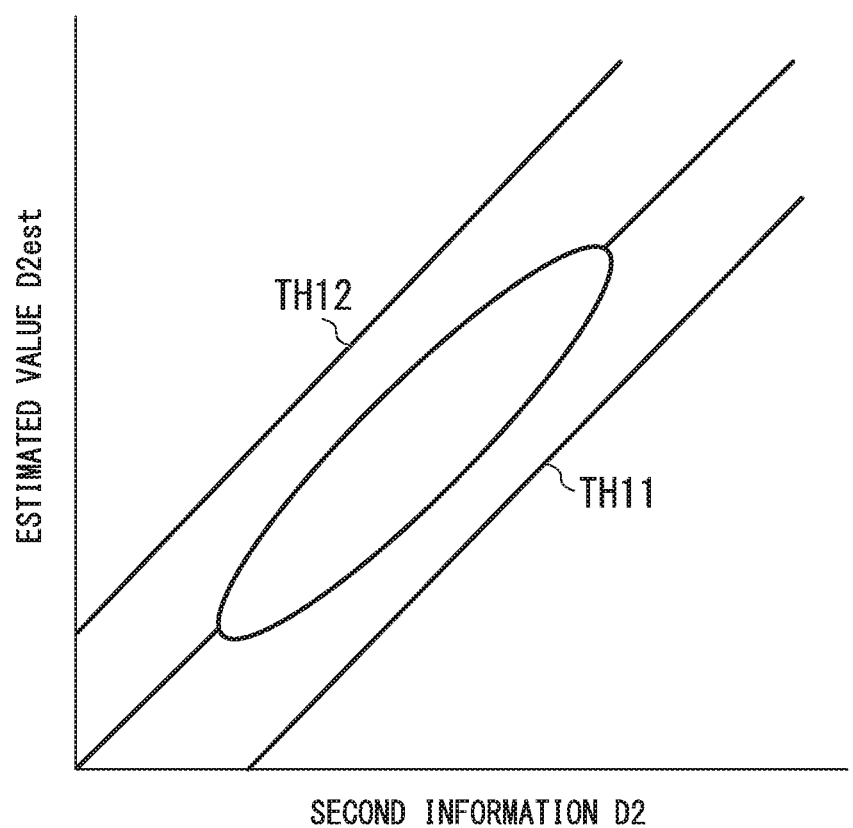
FIG. 8 is a diagram illustrating a fraud state detection process.

FIG. 8 is a diagram illustrating the fraud state detection process. In a graph illustrated in FIG. 8, the second information D2 included in the message M2 and an estimated value D2*est* of the second information D2 included in the message M2 are designated as axes. If there is linearity in the first information D1 and the second information D2, points (D1, D2) defined by a combination of the first information D1 and the second information D2 are distributed in an elliptical shape rising to the right. A lower limit value TH11 and an upper limit value TH12 which are determination threshold values are determined so that an elliptical range is included. If a point P (D1, D2) is in a range from the lower limit value TH11 to the upper limit value TH12 of the determination threshold values, the ECU 10-2 determines that a predetermined correlation is in the message M1 and the message M2, i.e., the first information D1 included in the message M1 and the second information D2 included in the message M2.

As described above, the ECU 10-2 has the same conversion rule 132 as the conversion rule 132 provided in the ECU 10-3. The ECU 10-2 performs a conversion process according to the conversion rule 132 on the basis the first information D1 of the message M1 received from the bus 2-1 and generates the estimated value D2*est* of the second information D2 included in the message M2 received from the bus 2-2 of another path. Thereafter, the ECU 10-2 determines a correlation between the second information D2 and the estimated value D2*est* thereof.

According to a process of determining this correlation, the ECU 10-2 can perform a determination process of comparing the second information D2 with the estimated value D2*est* in place of the determination process of comparing the second information D2 with the first information D1 by performing the conversion process according to the conversion rule 132 before the determination. Thereby, in the communication system 1, a comparison can be performed after aligning units (dimensions) of information and the determination of the correlation becomes more accurate.

The ECU 10-2 performs the comparison according to any method described above and determines that the state is in the fraud state if a predetermined correlation is not recognized in a result of the comparison.

Figure 9:
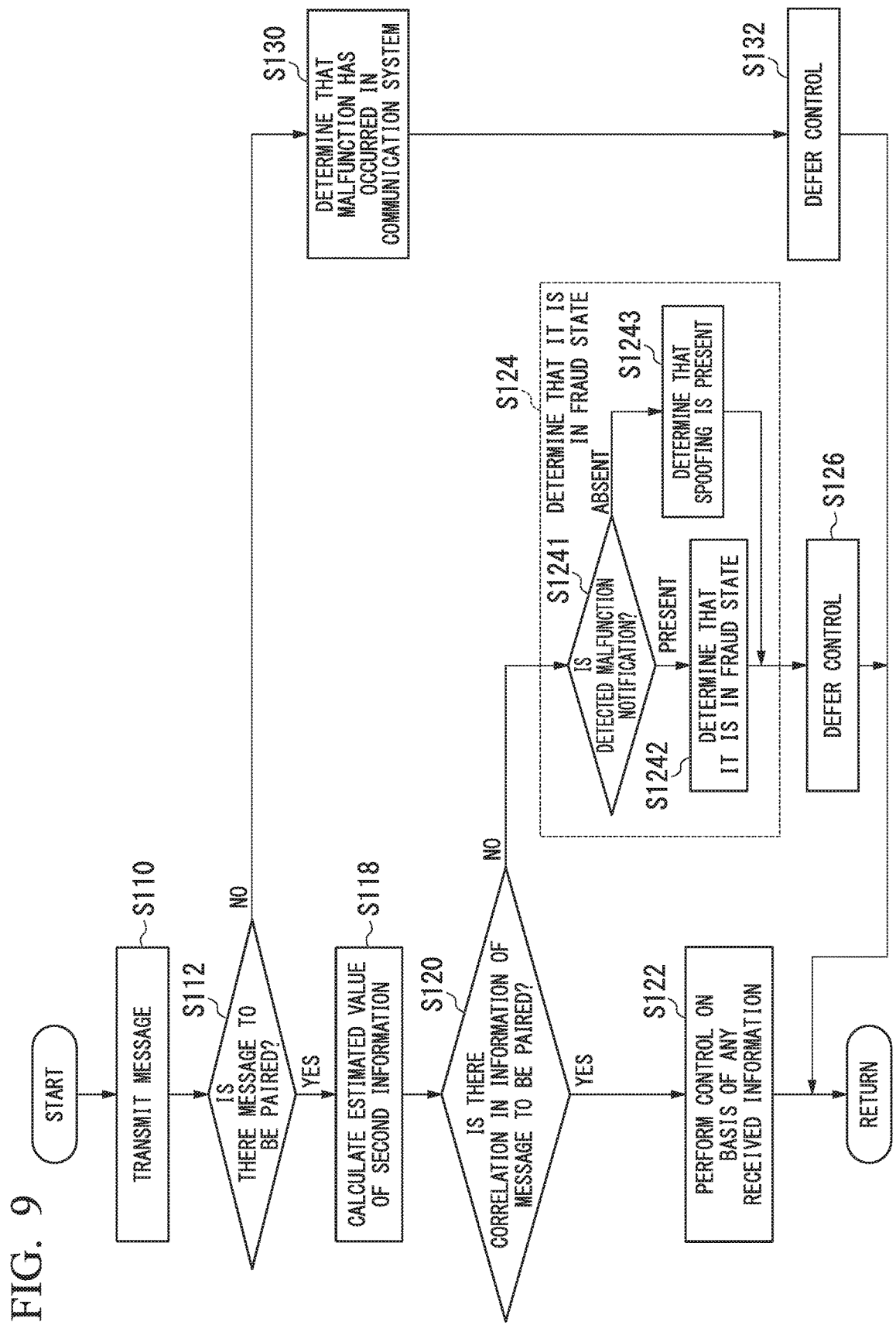
FIG. 9 is a flowchart illustrating an example of the fraud state detection process in the ECU which receives messages from two paths.

FIG. 9 is a flowchart illustrating an example of a fraud state detection process in the ECU 10-2 which receives the messages M from two paths. First, the reception processing unit 182-2 receives the messages M including an ID for which its own device is designated as a transmission destination from the two paths of the bus 2-1 and the bus 2-2 (S110). Next, the reception processing unit 182-2 determines whether there is a message M to be paired with the messages M received from the two paths described above (S112). For example, in the above-described determination, the reception processing unit 182-2 determines that messages M for which a time difference between reception times of the messages M is within a predetermined value are paired.

If it is determined that a message M to be paired is present in S112, the reception processing unit 182-2 calculates an estimated value for the second information D2 included in the message M2 received from the bus 2-2 (S118).

Next, the reception processing unit 182-2 determines whether there is a correlation in information included in the messages M to be paired (S120). If it is determined that there is a correlation in information included in the messages M to be paired in S120, the reception processing unit 182-2 controls associated hardware on the basis of information included in any received message M (S122) and ends a series of processes. Also, an example of the above-described hardware is the transmission 22.

On the other hand, if it is determined that there is no correlation in the information included in the messages M to be paired in S120, the reception processing unit 182-2 determines that the communication system 1 is in the fraud state (S124).

For example, the reception processing unit 182-2 determines whether there is an abnormality notification (S32 of FIG. 7) from the ECU 10-3 to specify a factor of the detected fraud state (S1241). If it is determined that there is an abnormality notification in S1241, it is determined that there is a fraud state is in the ECU 10-3. On the other hand, if it is determined that there is an abnormality notification in S1241, the reception processing unit 182-2 determines that there is spoofing of the ECU 10-1 (S1243).

After the process of S124 ends, the reception processing unit 182-2 defers control of hardware to be performed on the basis of information included in the received message M (S126) and ends a series of processes by performing a predetermined process according to a determination result of S1242 or S1243.

Also, if it is determined that there is no message M to be paired in S112, the reception processing unit 182-2 determines that a malfunction has occurred in the communication system 1 (S130), defers control of hardware to be performed on the basis of information included in the received message M (S132), and ends a series of processes.

Next, specific examples of application of the present embodiment will be described.

The ECU 10-1 controls the fuel injection device 21 using a control instruction value (the first information D1) indicating a fuel injection amount. The ECU 10-1 transmits the control instruction value indicating the fuel injection amount to the bus 2-1 and the bus 2-2. The ECU 10-2 receives its control instruction value from the bus 2-1 and receives an output value (the second information D2) of the engine 23 operating according to the control instruction value from the bus 2-2.

The ECU 10-2 calculates the output prediction value (the estimated value D2*est*) predicted from the control instruction value and determines that a fraud has occurred if the output prediction value and a currently acquired output value are different beyond a predetermined degree.

Further, the ECU 10-3 detects the above-described malfunction occurring in the control target. For example, there is an abnormal state in which an estimated output value of the engine 23 predicted from the control instruction value for the engine 23 and an actual output value of the engine 23 are different. The ECU 10-3 compares the estimated output value of the engine 23 with the actual output value of the engine 23 and estimates that the malfunction is in the engine 23 when the difference is greater than a predetermined value.

The ECU 10-3 notifies the ECU 10-2 of the determination result and the ECU 10-2 acquires its malfunction notification. Thereby, the ECU 10-2 detects that the malfunction has occurred in the engine 23. Further, the ECU 10-2 determines whether the malfunction of the engine 23 or the presence of a device spoofing the ECU 10-1 serves as a factor by combining the result of the malfunction notification and the result of determining that the above-described malfunction has occurred. Thereby, the ECU 10-2 can detect the malfunction in the ECU 10-3 (the malfunction of the corresponding hardware) and the presence of the spoofing device of the ECU 10-1 unspecified in the comparison based on the message M1 and the message M2 using the malfunction notification from the ECU 10-3.

According to the above-described embodiment, the ECU 10-1 transmits the message M1 to each of the bus 2-1 and the bus 2-2 provided within the vehicle, controls an in-vehicle device on the basis of the message M1 transmitted to the bus 2-2 by the ECU 10-3, and transmits a second signal indicating a result of control to the bus 2-2 and the ECU 10-2 performs a comparison on the basis of the first information D1 included in the message M1 received from the bus 2-1 and the second information D2 included in the message M2 received from the bus 2-2 and detects a fraud state in the vehicle, thereby protecting the ECU 10 from fraudulent behavior in the network according to a simpler configuration.

Also, according to the first embodiment, it is not essential for the ECU 10 to receive a message (a frame) to which an ID of its own device is attached as an ID of a transmission source or a transmission destination in the ECU 10. The ECU 10 can be configured to use a general reception process of receiving the message to which the ID of its own device is attached as the ID of the transmission destination.

Also, according to the first embodiment, it is possible to increase the reliability of the communication system 1 and further increase the efficiency of utility of network resources by transmitting messages M corresponding to networks NW including a plurality of transmission paths such as the above-described buses 2.

Also, according to the first embodiment, the ECU 10-2 can avoid complexity without generating a signal to be used to exclusively detect the fraud state because a signal for controlling the function of the vehicle by the ECU 10-2 is used to detect the fraud state. Likewise, it is possible to prevent a communication process from being complex without generating a signal to be used to exclusively detect the fraud state because a signal related to a control result of a function of the vehicle with respect to the ECU 10-3 is used to detect the fraud state in the ECU 10-2.

First Modified Example of First Embodiment

The first modified example of the first embodiment will be described. The present modified example is different from the first embodiment in terms of targets to be compared by the ECU 10-2. This point will be described.

Figure 10:
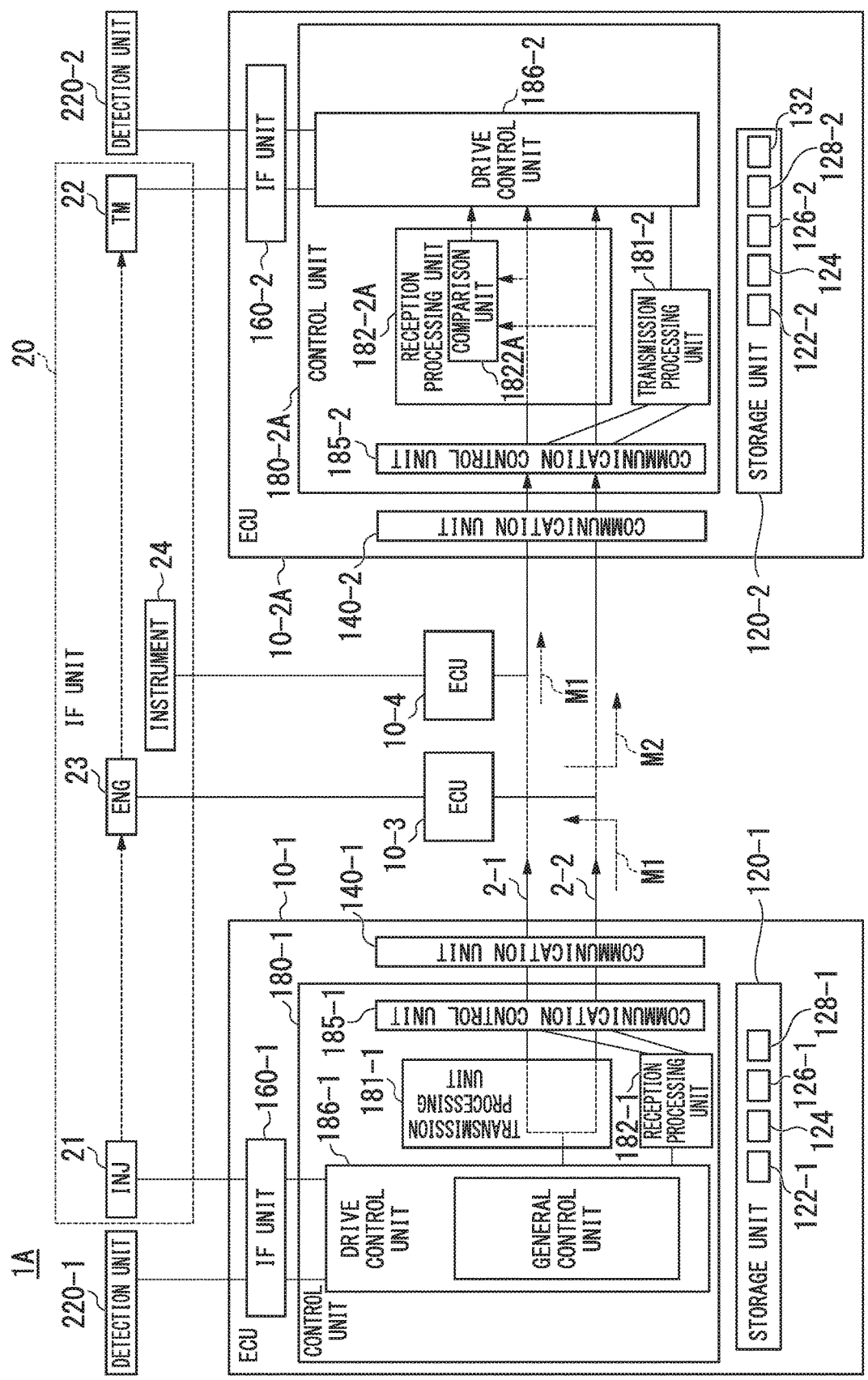
FIG. 10 is a diagram illustrating a communication system of a first modified example of the first embodiment.

FIG. 10 is a diagram illustrating a communication system 1A of the first modified example of the first embodiment. The communication system 1 includes an ECU 10-1, an ECU 10-2A, an ECU 10-3, and an ECU 10-4.

(ECU 10-2A)

The ECU 10-2A includes, for example, a storage unit 120-2, a communication unit 140-2, an IF unit 160-2, and a control unit 180-2A. The control unit 180-2A includes a transmission processing unit 181-2, a reception processing unit 182-2A, a communication control unit 185-2, and a drive control unit 186-2. The reception processing unit 182-2A includes a comparison unit 1822A.

(Fraud State Detection Process)

Next, details of the fraud state detection process of the communication system 1 of the present modified example will be described.

Figure 11:
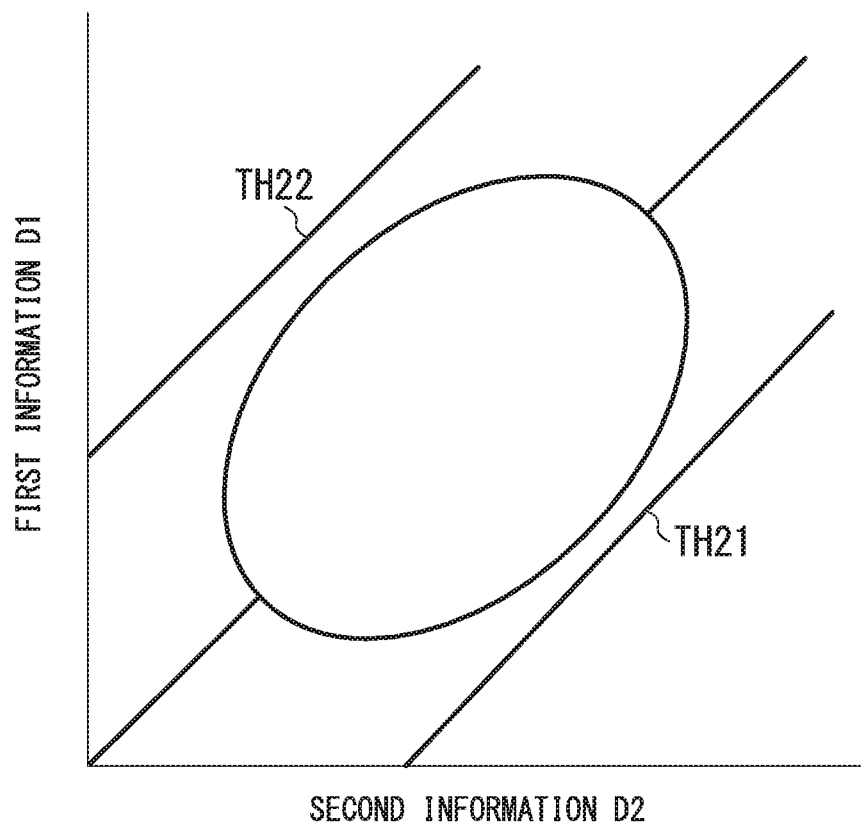
FIG. 11 is a diagram illustrating the fraud state detection process.

FIG. 11 is a diagram illustrating the fraud state detection process. A graph illustrated in FIG. 11 is different from the above-described graph of FIG. 8 in terms of a vertical axis. First information D1 included in the message M1 and second information D2 included in the message M2 are designated as axes. If there is linearity in the first information D1 and the second information D2, points (D1, D2) defined by a combination of the first information D1 and the second information D2 are distributed in an elliptical shape rising to the right. A lower limit value TH21 and an upper limit value TH22 which are determination threshold values are determined so that an elliptical range is included. If a point P (D1, D2) is in a range from the lower limit value TH21 to the upper limit value TH22 of the determination threshold values, the ECU 10-2 determines that a predetermined correlation is in the message M1 and the message M2, i.e., the first information D1 included in the message M1 and the second information D2 included in the message M2.

Figure 12:
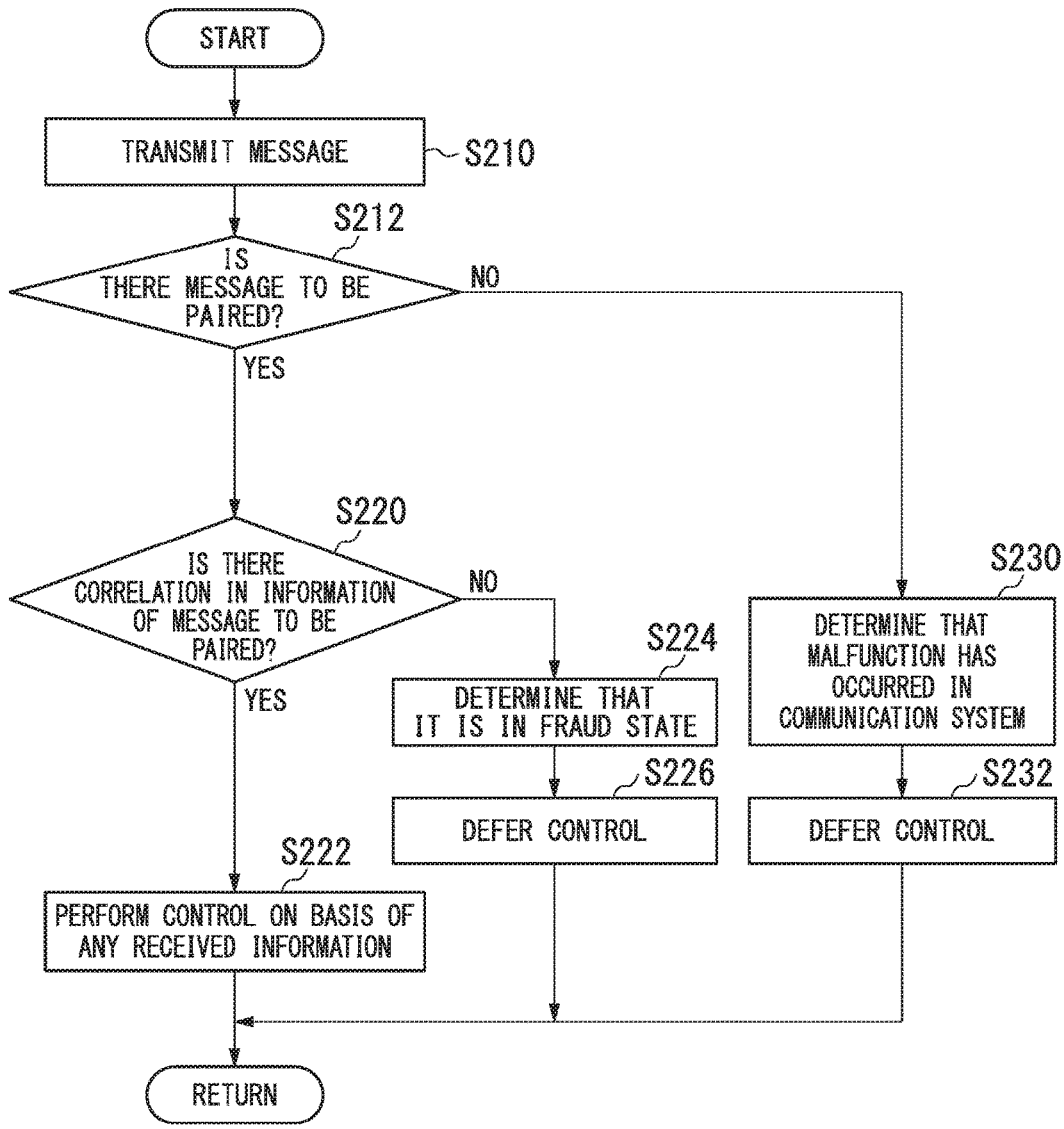
FIG. 12 is a flowchart illustrating an example of the fraud state detection process in the ECU which receives messages from two paths.

FIG. 12 is a flowchart illustrating an example of the fraud state detection process in the ECU 10-2 which receives messages M from two paths. Differences from the above-described FIG. 9 will be mainly described.

First, the reception processing unit 182-2A receives messages N from the bus 2-1 and the bus 2-2 (S210) and determines whether there is a message M to be paired (S212).

If it is determined that there is a message M to be paired in S212, the reception processing unit 182-2 determines whether there is a correlation in information included in the message M to be paired (S220). More specifically, a comparison unit 1822A of the reception processing unit 182-2A determines whether there is a correlation in the first information D1 and the second information D2 through a comparison. If it is determined that there is a correlation in the first information D1 and the second information D2 in S220, the reception processing unit 182-2 controls associated hardware on the basis of one of the first information D1 and the second information D2 (S222) and ends a series of processes.

On the other hand, if it is determined that there is no correlation in the first information D1 and the second information D2 in S220, the reception processing unit 182-2 determines that the communication system 1 is in the fraud state (S224), defers control of hardware to be performed on the basis of the first information D1 and the second information D2 (S226), and ends a series of processes.

According to the first modified example of the first embodiment described above, the fraud state is detected by comparing the first information D1 and the second information D2 received by the ECU 10-2 and an effect similar to that of the first embodiment is shown.

Second Modified Example of First Embodiment

The second modified example of the first embodiment will be described. The present modified example is different from the first embodiment in terms of a conversion process to be performed by the ECU 10-2. This point will be described. The reception processing unit 182-2 generates predicted information D1$est$ by predicting original information serving as a basis from which the second information D2 is generated by the ECU 10-2 on the basis of the second information D2 and determines that a fraud has occurred if the first information D1 included in the message M1 and the predicted information D1*est* are different beyond a predetermined degree. According to the second modified example of the first embodiment described above, an effect similar to that of the first embodiment is shown by performing inverse conversion of the conversion process in the ECU 10-3 on the basis of the second information D2 to obtain the predication information D1*est*.

(Third Modified Example of First Embodiment)

The third modified example of the first embodiment will be described. Although the first embodiment in which the malfunction in the ECU 10-3 and the presence of the spoofing device of the ECU 10-1 are detected using the malfunction notification provided by the other ECU 10 in the fraud state detection process has been described, the ECU 10-2 in the present modified example does not use the malfunction notification provided by the other ECU 10 in the fraud state detection process. This point will be described.

The ECU 10-2 detects the fraud state in the communication system 1 from the result of the fraud state detection process. In this case, the detection of the spoofing device of the ECU 10-1 may be implemented by other means. According to the third modified example of the first embodiment described above, the ECU 10-2 can detect the fraud state even when the other ECU 10 does not provide a notification of its own malfunction.

Second Embodiment

Hereinafter, the second embodiment will be described. The second embodiment is different from the first embodiment in that the ECU 10-1B transmits messages M including different information to the bus 2-1 and the bus 2-2, a signal of one transmission path is converted, and the second device compares signals received from a plurality of transmission paths thereof. Here, this difference will be mainly described.

Figure 13:
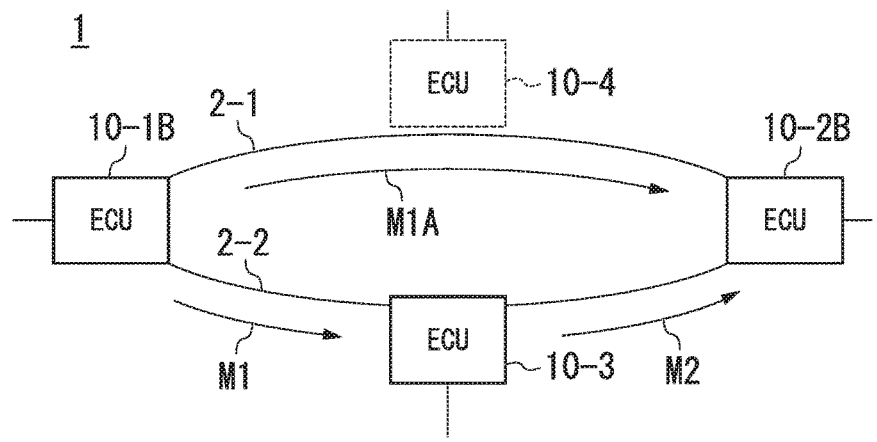
FIG. 13 is a diagram illustrating a configuration of a communication system of a second embodiment.
Figure 14:
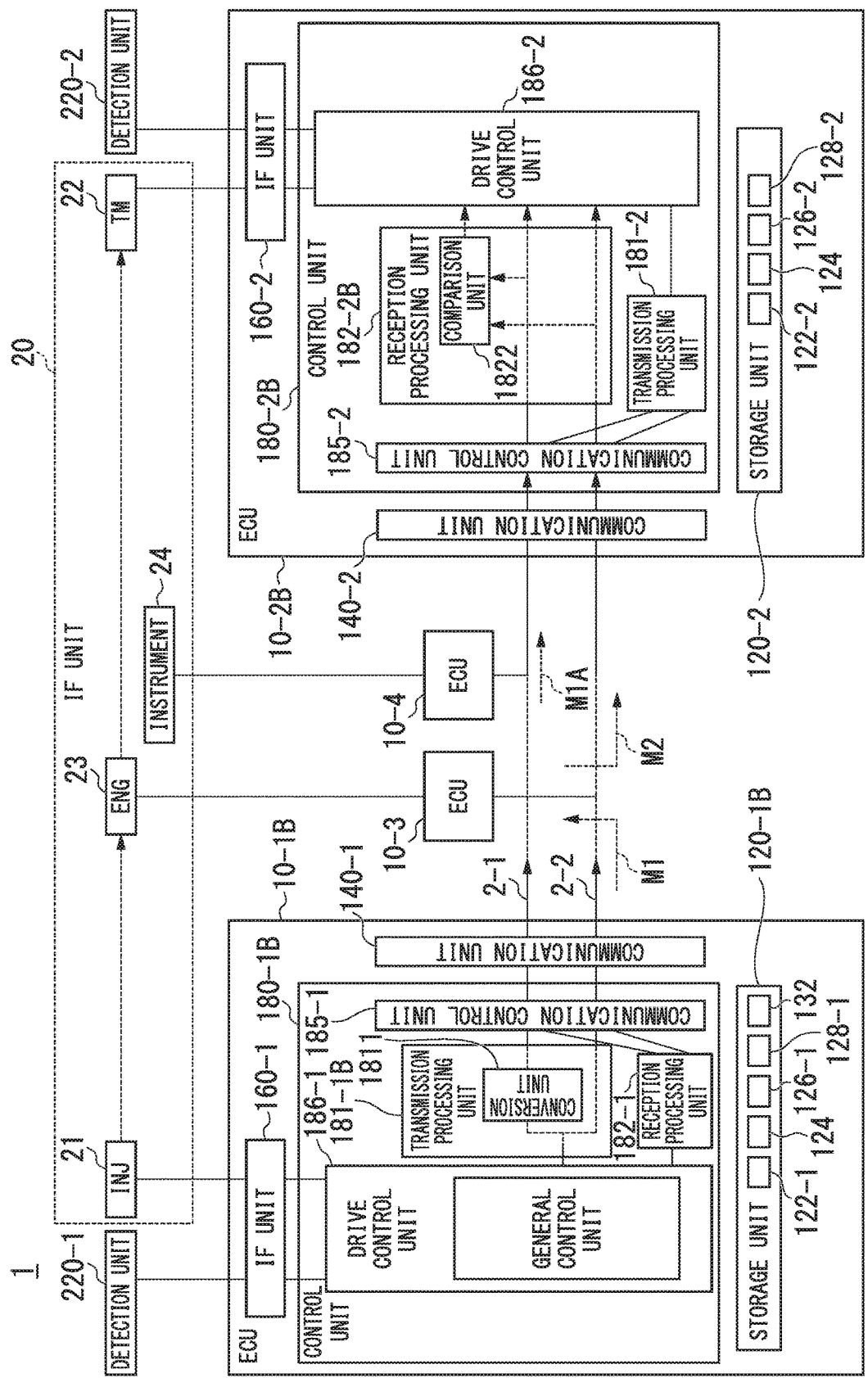
FIG. 14 is a diagram illustrating a configuration of the communication system of the present embodiment.

FIGS. 13 and 14 are diagrams illustrating a configuration of the communication system 1 of the present embodiment. The difference between the above-described configuration of FIG. 1 will be mainly described. Also, in FIGS. 13 and 14, there are positions at which parts in common with the above-described FIG. 1 are omitted. Also, in FIGS. 13 and 14, an example of the fraud state detection process when the communication system 1 is in a certain communication state is shown.

The communication system 1 includes an ECU 10-1B, an ECU 10-2B, an ECU 10-3, and an ECU 10-4.

(ECU 10-1B)

The ECU 10-1B includes, for example, a storage unit 120-1B, a communication unit 140-1, an IF unit 160-1, and a control unit 180-1B.

The storage unit 120-1B includes the same conversion rule 132 as the conversion rule 132 of the ECU 10-2 for the above-described storage unit 120-1.

The control unit 180-1B includes a transmission processing unit 181-1B, a reception processing unit 182-1, a communication control unit 185-1, and a drive control unit 186-1. The transmission processing unit 181-1B includes a conversion unit 1811 and converts the message M1 to be transmitted to the bus 2-1 according to the conversion rule 132 by the conversion unit 1811. The transmission processing unit 181-1B generates a message M1A and transmits the generated message M1A to the bus 2-1. The above-described point is different from the transmission processing unit 181-1.

(ECU 10-2B)

The ECU 10-2B includes, for example, a storage unit 120-2, a communication unit 140-2, an IF unit 160-2, and a control unit 180-2B. The control unit 180-2B includes a transmission processing unit 181-2, a reception processing unit 182-2B, a communication control unit 185-2, and a drive control unit 186-2. The reception processing unit 182-2B includes a comparison unit 1822B.

The comparison unit 1822B compares information included in the messages M without performing the conversion process based on the message M received from the bus 2.

(Fraud State Detection Process and Correlation Determination Method)

The ECU 10-1B performs the conversion process according to the conversion rule 132 on the basis of the first information D1 of the message M1 to be transmitted to the bus 2-2 and generates an estimated value D2*est* of the second information D2 included in the message M2 to be transmitted from the bus 2-2 of another path. The ECU 10-1B transmits the message M1A including the estimated value D2*est* to the bus 2-1 and transmits the message M1 including the first information D1 to the bus 2-2.

As described above, the ECU 10-3 receives the message M1 including the first information D1 from the bus 2-2 and transmits the message M2 including the second information D2 to the bus 2-2.

The ECU 10-2B compares the message M2 with the message M1A and determines that there is a correlation if the difference between the messages is in a predetermined range. For example, the ECU 10-2B performs a determination process based on the estimated value D2*est* of the message M1A and the second information D2 included in the message M2 received from the bus 2-1.

According to a process of determining this correlation, the ECU 10-1B can perform a determination process of comparing the second information D2 with the estimated value D2*est* in place of the determination process of comparing the second information D2 with the first information D1 by performing the conversion process according to the conversion rule 132 before the determination.

Thereby, in the communication system 1B, a comparison can be performed after aligning units of information and the determination of the correlation becomes more accurate.

Figure 15:
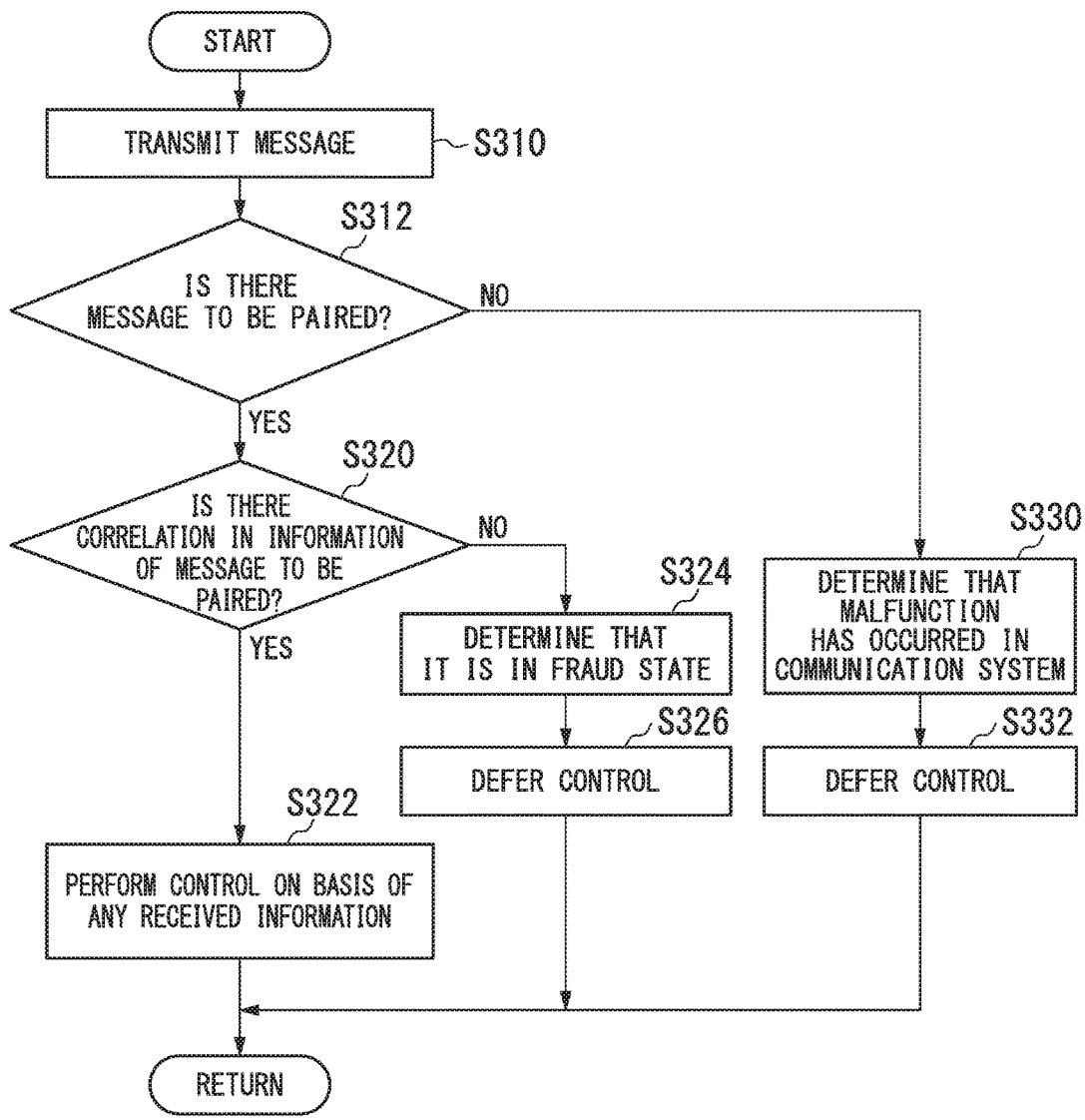
FIG. 15 is a flowchart illustrating an example of a fraud state detection process in an ECU which receives messages from two paths.

FIG. 15 is a flowchart illustrating an example of a fraud state detection process in the ECU 10-2 which receives the messages M from two paths. The difference between the above-described FIG. 9 will be mainly described. First, the reception processing unit 182-2B receives the messages M from the bus 2-1 and the bus 2-2 (S310) and determines whether there is a message M to be paired (S312).

If it is determined that there is a message M to be paired in S312, the reception processing unit 182-2 determines whether there is a correlation in information included in the message M to be paired (S320). More specifically, the comparison unit 1822B of the reception processing unit 182-2B determines whether there is a correlation in the estimated value D2*est* and the second information D2 through a comparison.

If it is determined that there is a correlation in the estimated value D2*est* and the second information D2 in S320, the reception processing unit 182-2B controls associated hardware on the basis of one of the estimated value D2*est* and the second information D2 (S322) and ends a series of processes.

On the other hand, if it is determined that there is no correlation in the estimated value D2*est* and the second information D2 in S320, the reception processing unit 182-2B determines that the communication system 1 is in the fraud state (S324), defers control of hardware to be performed on the basis of the estimated value D2est and the second information D2 (S326), and ends a series of processes.

Next, specific examples of application of the present embodiment will be described.

The ECU 10-1B controls the fuel injection device 21 using a control instruction value (the first information D1) indicating a fuel injection amount. The ECU 10-1B transmits the control instruction value indicating the fuel injection amount to the bus 2-2 and transmits an output prediction value (the second estimated value D2est) of the engine 23 predicted from the control instruction value to the bus 2-1.

The ECU 10-2B receives an output prediction value of the engine 23 from the bus 2-1 and receives an output value (the second information D2) of the engine 23 operating according to the control instruction value of the fuel injection amount from the bus 2-2. The ECU 10-2B determines that a fraud has occurred if the output prediction value of the engine 23 from the bus 2-1 and a currently acquired output of the engine 23 are different beyond a predetermined degree.

According to the second embodiment described above, a message M3 including the first information D1 (predetermined third information) is transmitted to the bus 2-2, the message M1A including a second estimated value D2est (first information) different from the first information D1 is transmitted to the bus 2-1, the engine 23 is controlled on the basis of the message M3 transmitted to the bus 2-2, for example, a result of control of the engine 23 (the second information D2) is obtained as information obtained by converting the first information D1, the message M2 indicating the second information D2 is transmitted to the bus 2-2, and it is determined that a predetermined correlation is not recognized if the first information D1 and the second information D2 are different beyond a predetermined degree, so that it is possible to protect the ECU 10 from fraudulent behavior in the network according to a simpler configuration.

Also, according to the second embodiment, it is possible to implement a simpler configuration when the ECU 10-1B transmits messages M including different types of information to the bus 2-1 and the bus 2-2 and the ECU 10-2B receives messages M including the same type of information in addition to an effect similar to that of the above-described first embodiment.

Third Embodiment

Hereinafter, the third embodiment will be described. The third embodiment is different from the first embodiment in that the ECU 10-1 transmits messages M including different information to the bus 24 and the bus 2-2, signals of one or two buses 2 are converted, and the ECU 10-2C performs a comparison on the basis of signals received from a plurality of transmission paths. Hereinafter, this difference will be mainly described.

Figure 16:
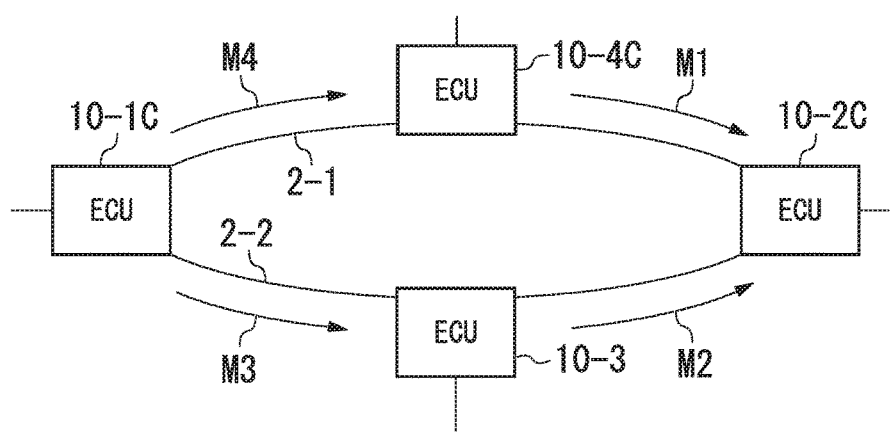
FIG. 16 is a diagram illustrating a configuration of a communication system of a third embodiment.
Figure 17:
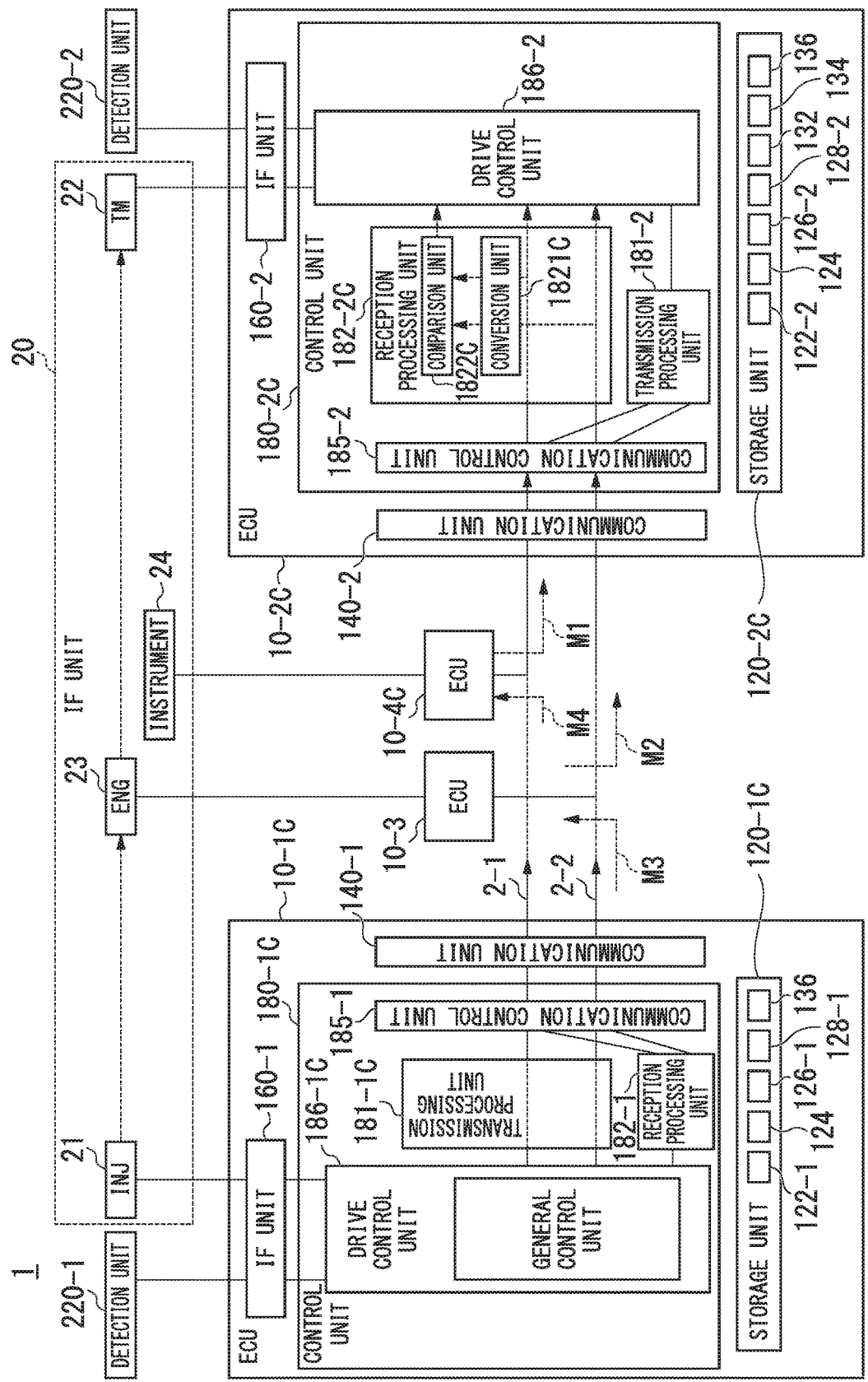
FIG. 17 is a diagram illustrating a configuration of the communication system of the present embodiment.

FIGS. 16 and 17 are diagrams illustrating a configuration of the communication system 1 of the present embodiment. Also, in FIGS. 16 and 17, there are positions at which parts in common with the above-described FIG. 1 are omitted. Also, in FIG. 16, an example of the fraud state detection process when the communication system 1 is in a certain communication state is shown. The communication system 1 includes an ECU 10-1C, an ECU 10-2C, an ECU 10-3, and an ECU 10-4.

(ECU 10-1C)

The ECU 10-1C includes, for example, a storage unit 120-1C, a communication unit 140-1, an IF unit 160-1, and a control unit 180-1C.

The storage unit 120-1C further includes a correspondence table 136 for the above-described storage unit 120-1. The correspondence table 136 stores information for converting control information to be transmitted to the bus 2-1 and the bus 2-2 from at least one piece of control information into the other control information. Information stored in the correspondence table 136 may be obtained by performing conversion from the other control information into the one piece of control information in the inverse direction to the above. Information stored in the correspondence table 136 may be configured as numerical data as in a conversion table or may be configured as a conversion expression indicating a correspondence relationship. In the following description, information stored in the correspondence table 136 is referred to as a conversion rule.

The control unit 180-1C includes a transmission processing unit 181-1C, a reception processing unit 182-1, a communication control unit 185-1, and a drive control unit 186-1C. The drive control unit 186-1C generates control information using the correspondence table 136 and requests the transmission control unit 181-C to transmit the control information. The above-described control information includes control information included in the message M4 and transmitted to the bus 2-1 and control information included in the message M3 and transmitted to the bus 2-2. The items of control information are paired with each other and the paired control information has a correlation according to the conversion rule stored in the correspondence table 136. The transmission processing unit 181-1C generates the message M4 to transmit the generated message M4 to the bus 2-1 and generates the message M3 to transmit the generated message M3 to the bus 2-2 according to a request from the drive control unit 186-1C.

The above-described point is different from the transmission processing unit 181-1.

(ECU10-4C)

Figure 18:
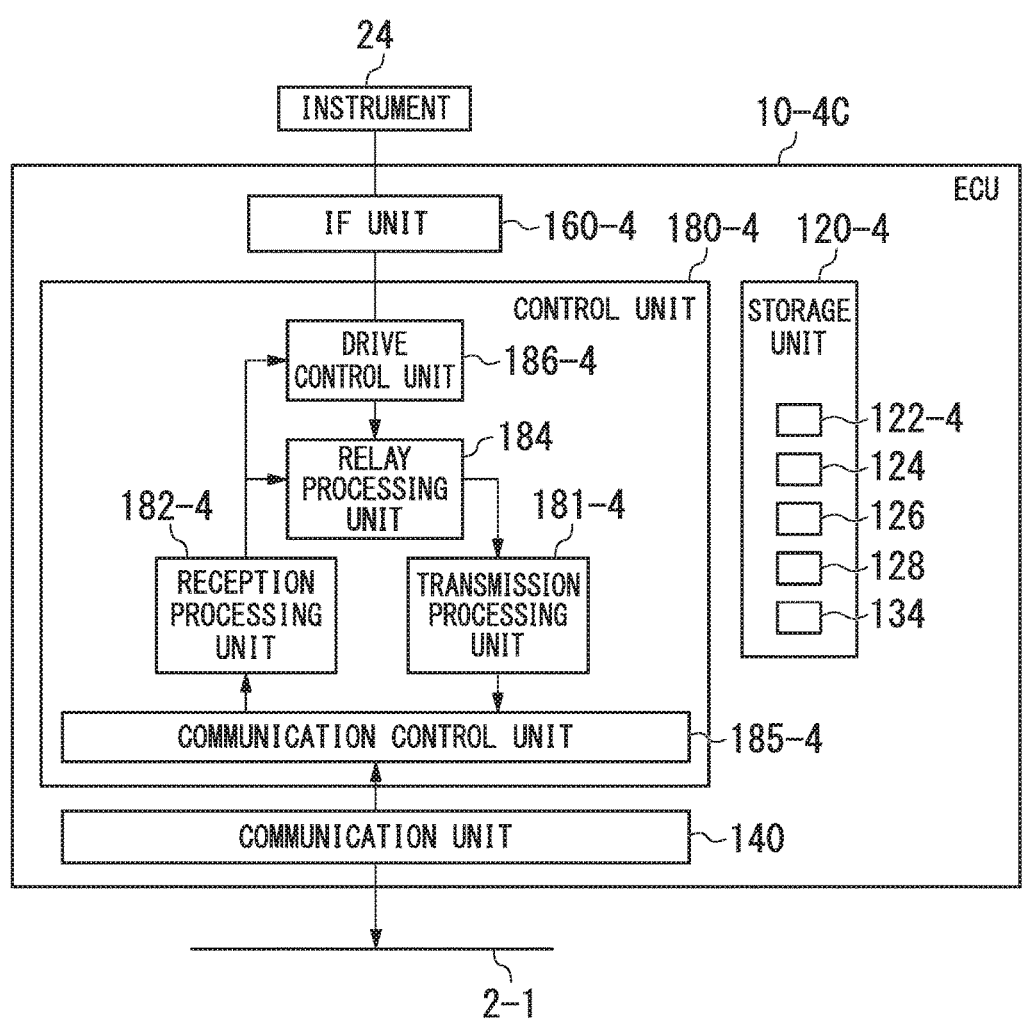
FIG. 18 is a diagram illustrating a configuration example of an ECU of the present embodiment.

FIG. 18 is a diagram illustrating a configuration example of the ECU 10-4C. The ECU 10-4C includes, for example, a storage unit 120-4, a communication unit 140, an IF unit 160-4, and a control unit 180-4. Parts of the ECU 10-4C correspond to those of the above-described ECU 10-3.

The storage unit 120-4 corresponds to the storage unit 120-3 and includes a conversion rule 134 in place of the conversion rule 132 of the storage unit 120-3. The conversion rule 134 includes a conversion rule for converting the message M4 into the message M1. The above-described conversion rule 132 is referred to in relation to points other than those for the conversion rule 134.

The control unit 180-4 includes a transmission process unit 181-4, a reception processing unit 182, a relay processing unit 184, a communication control unit 185-4, and a drive control unit 186-4. A detection unit 220 is absent in the drive control unit 186-4 corresponding thereto and a control response value may not be output. The relay processing unit 184 corresponds to the relay processing unit 183 and performs a similar process according to the conversion rule 134. The relay processing unit 184 converts the message M4 into the message M1 and causes the message M1 to be transmitted.

The relay processing unit 184 functions as a virtual sensor in place of receiving a control result from the drive control unit 186-4 and generates the control result according to the conversion rule 134.
(ECU 10-2C)

Returning to FIG. 17, the ECU 10-2C will be described. The ECU 10-2C includes, for example, a storage unit 120-2C, a communication unit 140-2, an IF unit 160-2, and a control unit 180-2C.

The storage unit 120-2C further includes the conversion rule 134 and the correspondence table 136 in addition to the configuration of the above-described storage unit 120-2.

The control unit 180-2C includes a transmission processing unit 181-2, a reception processing unit 182-2C, a communication control unit 185-2, and a drive control unit 186-2. The reception processing unit 182-2C corresponds to the reception processing unit 182-2.

The reception processing unit 182-2C of the present embodiment includes a conversion unit 1821C and a comparison unit 1822C. The conversion unit 1821C converts at least one of the first information D1 and the second information D2 which are predetermined according to a predetermined conversion rule. The comparison unit 1822C compares a result after conversion by the conversion unit 1821C with the other information unconverted by the conversion unit 1821C. Alternatively, the comparison unit 1822C compares results after conversion by the conversion unit 1821C with each other. The above-described reception processing unit 182-2 generates estimated information according to the conversion rule 132 from the information included in the received message M, but the reception processing unit 182-2C generates estimated information according to the conversion rule 134 in addition thereto. The reception processing unit 182-2C performs an estimation process using only the conversion rule 132, only the conversion rule 134, or both the conversion rule 132 and the conversion rule 134. The reception processing unit 182-2C may perform a conversion process based on the correspondence table 136.
(Fraud State Detection Process)

Next, the fraud state detection process of the communication system 1 will be described with reference to the above-described FIG. 11. In the example shown in the present embodiment, the ECU 10-2 performs the fraud state detection process.

The ECU 10-1C transmits a message M for the control device to each of the bus 2-1 and the bus 2-2. The ECU 10-4C controls the instrument 24 on the basis of the message M4 transmitted to the bus 2-1 and transmits the message M1 indicating a result of control to the bus 2-1.

The ECU 10-3 controls the engine 23 on the basis of the message M3 transmitted to the bus 2-2 and transmits the message M2 indicating a result of control to the bus 2-2.

Here, the ECU 10-2C receives the message M1 from the bus 2-1, receives the message M2 from the bus 2-2, and detects the fraud state in the vehicle on the basis of the message M1 and the message M2. The ECU 10-2C performs a comparison on the basis of the first information D1 included in the message M1 and the second information D2 included in the message M2. The ECU 10-2C determines that the state is in a fraud state when a predetermined correlation is not recognized between the first information D1 and the second information D2 from a comparison result.

Figure 19:
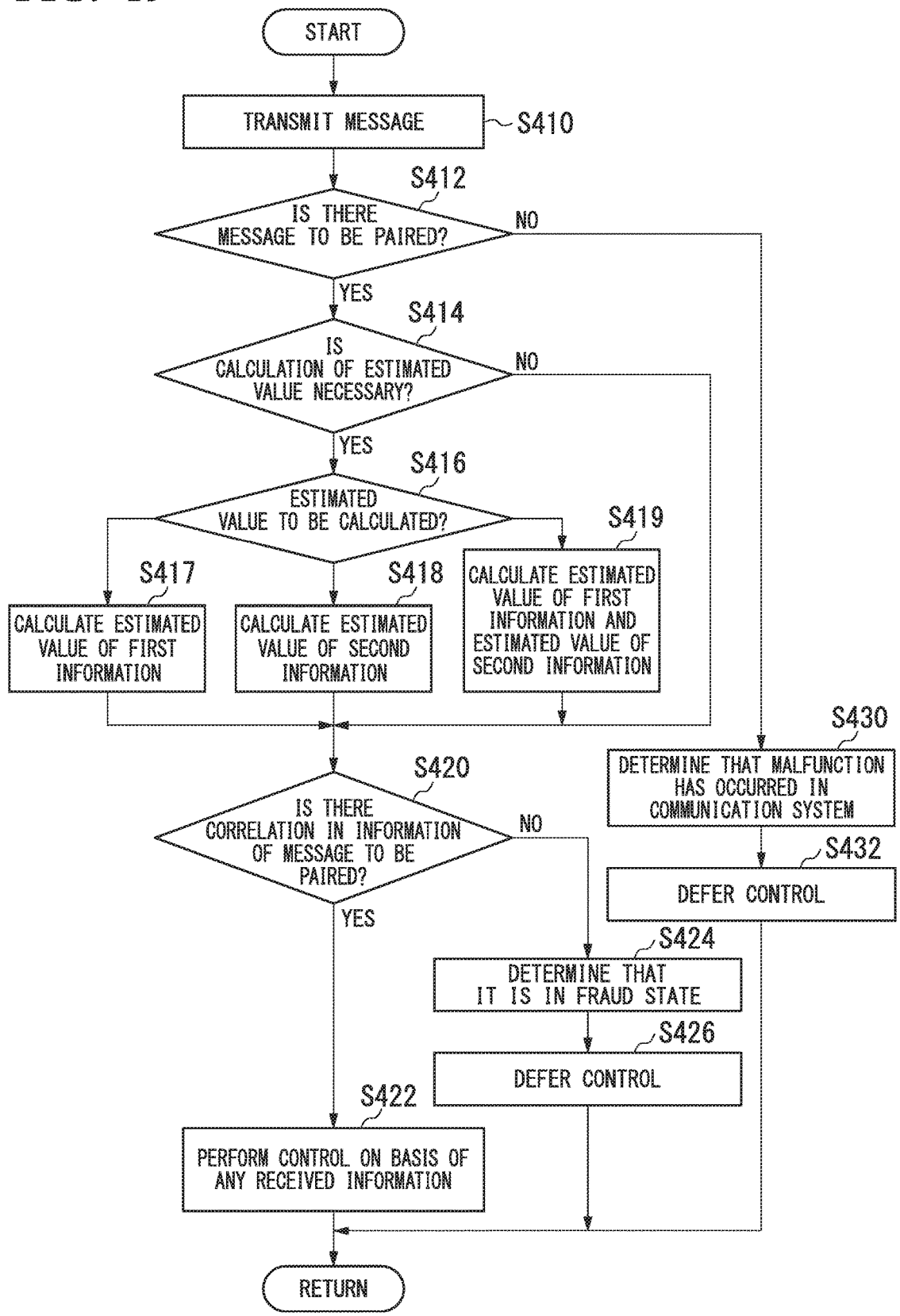
FIG. 19 is a flowchart illustrating an example of a fraud state detection process in the ECU which receives messages from two paths.

FIG. 19 is a flowchart illustrating an example of the fraud state detection process in the ECU 10-2C which receives messages from two paths. Among processes illustrated in FIG. 19, processes similar to those illustrated in FIG. 4 described above are omitted and differences will be mainly described.

First, the reception processing unit 182-2C receives messages M including IDs for which the ECU 10-2C is designated as a transmission destination from two paths of the bus 2-1 and the bus 2-2 (S410). Next, the reception processing unit 182-2C determines whether there is a message M to be paired in the messages M received from the above-described two paths (S412).

If it is determined that there is a message M to be paired in S412, the ECU 10-2C determines whether a calculation of an estimated value is necessary (S414). The designation of the calculation of the estimated value is selected by the reception processing unit 182-2 according to, for example, an instruction from the ECU 10-1 or the like. If it is determined that the calculation of the estimated value is unnecessary in S414, the ECU 10-2 proceeds to the process of S420.

On the other hand, when it is determined that the calculation of the estimated value is necessary in S414, the calculated estimated value is selected (S416). If the first information D1 is selected, the reception processing unit 182-2C calculates an estimated value of the first information D1 (S417) and the ECU 10-2C proceeds to the process of S420.

If the second information D2 is selected, the reception processing unit 182-2C calculates an estimated value of the second information D2 (S418) and the ECU 10-2 proceeds to the process of S420. If the first information D1 and the second information D2 are selected, the reception processing unit 182-2C calculates both the estimated value of the first information D1 and the estimated value of the second information D2 (S419). On the basis of a result of the process of S414, S417, S418, or S419, the reception processing unit 182-2C performs processes similar to the above-described processes of S420 to S426 and ends a series of processes.

Also, if it is determined that there is a message to be paired in S412, the reception processing unit 182-2C determines that a malfunction has occurred in the communication system 1 (S430), defers control based on received information (S432), and ends a series of processes.
(Correlation Determination Method in Fraud State Detection Process)

Figure 20:
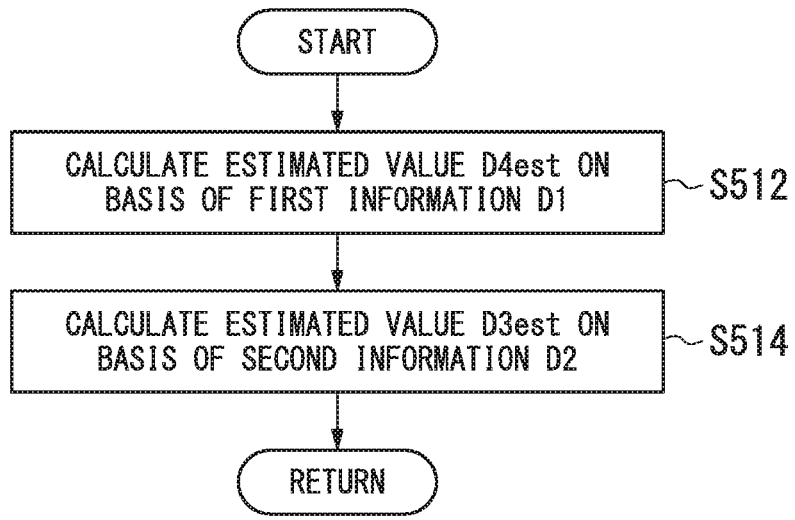
FIG. 20 is a flowchart illustrating an example of a correlation determination process in the fraud state detection process.
Figure 21:
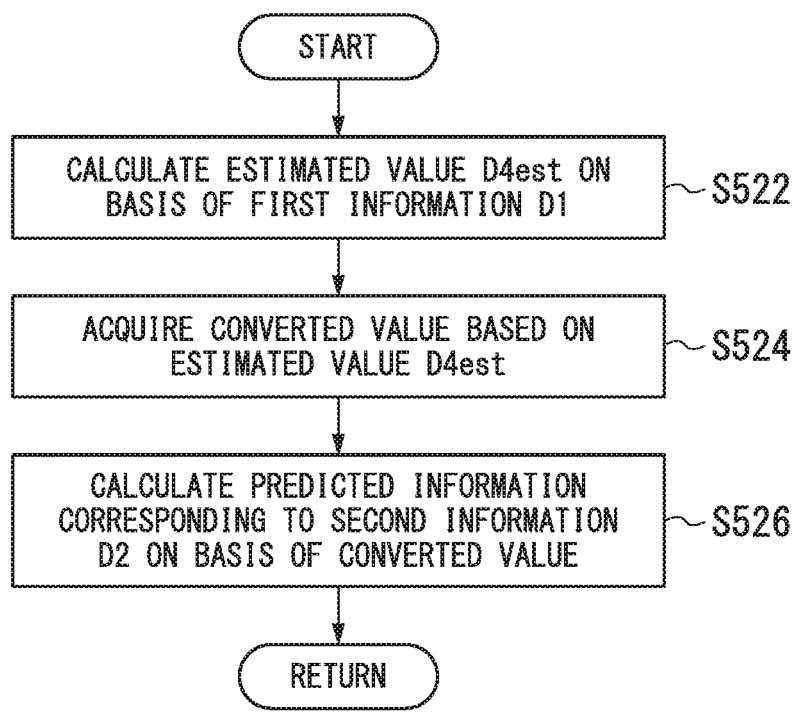
FIG. 21 is a flowchart illustrating an example of the correlation determination process in the fraud state detection process.
Figure 22:
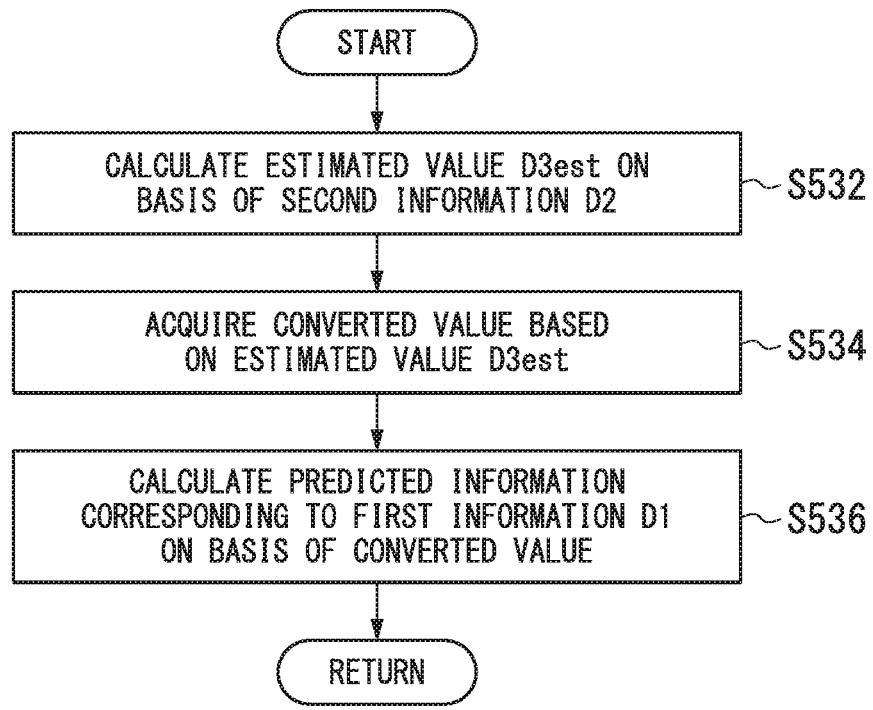
FIG. 22 is a flowchart illustrating an example of the correlation determination process in the fraud state detection process.

A more specific method of the correlation determination method in the fraud detection process will be described. FIGS. 20 to 22 are flowcharts illustrating an example of a correlation determination process in the fraud state detection process.
(First Determination Method)

A correlation of information transmitted by the ECU 10-1 may be higher than a correlation of information received by the ECU 10-2.

A predetermined correlation is present between information D4 included in the message M4 transmitted to the bus 2-1 by the ECU 10-1 and information D3 included in the message M3 transmitted to the bus 2-2 by the ECU 10-1 and is higher than a correlation of information received by the ECU 10-2.

The ECU 10-2C cannot directly receive the message M transmitted to the bus 2 by the ECU 10-1C and the receivable message M and its information are as follows. The ECU 10-4 generates the first information D1 by converting the fourth information D4 included in the message M4 transmitted by the ECU 10-1C and transmits the generated first information D1 as the message M1. The ECU 10-3 generates the second information D2 by converting information D3 included in the message M3 transmitted by the ECU 10-1C and transmits the generated second information D2 as the message M2. The ECU 10-2C obtains the first information D1 and the second information D2 described above by receiving the message M1 and the message M2.

Therefore, the ECU 10-2C estimates information transmitted by the ECU 10-1C using the received information. If the estimated information has a predetermined correlation, the ECU 10-2C determines that there is a correlation in information received by the ECU 10-2C. For example, the ECU 10-2C uses the correspondence table 136 in which the above-described correlation is converted into a numerical value in the determination.

An example of the specific process of the first determination method is illustrated in FIG. 20. First, the reception processing unit 182-2C calculates an estimated value of the fourth information D4 (first original information) (hereinafter referred to as an estimation value D4$est$) serving as a basis from which the first information D1 is generated by the ECU 10-4 on the basis of the first information D1 (S512). The estimated value D4$est$ corresponds to the above-described fourth information D4. Also, the reception processing unit 182-2C calculates an estimated value of the third information D3 (second original information) (hereinafter referred to as an estimated value D3$est$) serving as a basis from which the second information D2 is generated by the ECU 10-3 on the basis of the second information D2 (S514). The estimated value D3$est$ corresponds to the above-described third information D3.

The reception processing unit 182-2C compares relations of the estimated value D4$est$ and the estimated value D3$est$ with reference to the correspondence table 136. For example, the reception processing unit 182-2C converts the estimated value D4$est$ using the correspondence table 136, thereby converting a conversion result into a value having the same dimension as the estimated value D3$est$. The above-described process is an example of when S419 of FIG. 19 described above is selected.

(Second Determination Method)

Next, the second determination method will be described. As in the first determination method, the correspondence table 136 is used in the second determination method. The estimated value D4$est$ and the estimated value D3$est$ are compared in the above-described example, but one estimated value is used in the following example. Here, an example in which the estimated value D4$est$ related to the ECU 10-4 is used is shown.

In the second determination method, a model in which information obtained by converting the estimated value D4$est$ related to the ECU 10-4 using the above-described correspondence table 136 is designated as input information of the ECU 10-3 is considered. Information serving as a base when the ECU 10-3 generates the second information D2 is information D3. If there is a correlation between information converted using the above-described correspondence table 136 and the above-described information D3, there is a correlation between conversion results when the ECU 10-3 converts the above-described information.

An example of a specific process of a second determination method is illustrated in FIG. 21. First, the reception processing unit 182-2C determines an estimated value D4$est$ serving as a basis from which the first information D1 is generated by the ECU 10-4 on the basis of the first information D1 (S522), acquires a converted value based on the estimated value D4$est$ (S524), and calculates second predicted information capable of being generated by the ECU 10-3 on the basis of the converted value (S526). The reception processing unit 182-2C compares the second predicted information determined on the basis of the first information D1 with the second information D2. The above-described process is an example of when S417 of FIG. 19 described above is selected.

(Third Determination Method)

Next, the third determination method will be described. As shown in the second determination method, it is possible to use the estimated value D3$est$ related to the ECU 10-3. In this case, the ECU 10-2C performs the following process.

An example of the specific process of the third determination method is illustrated in FIG. 22. First, the reception processing unit 182-2C determines an estimated value D3$est$ serving as a basis from which the second information D2 is generated by the ECU 10-3 on the basis of the second information D2 (S532), acquires a converted value based on the estimated value D3$est$ (S534), and calculates first predicted information capable of being generated by the ECU 10-4 on the basis of the converted value (S536). The reception processing unit 182-2C compares the first predicted information determined on the basis of the second information D2 with the first information D1. The above-described process is an example of when S418 of FIG. 19 described above is selected.

The ECU 10-2C performs any one of the above-described three types of determination method. Alternatively, the above-described determination method may be configured to be selected and performed on the basis of setting information.

Next, a specific example of application of the present embodiment will be described. The ECU 10-1 controls the fuel injection device 21. The ECU 10-1 transmits a control instruction value (the first information D1) indicating an engine speed to the bus 2-1 and transmits a control instruction value (the second information D2) of an output torque to the bus 2-2. The ECU 10-4 operates the instrument 24 so that an indication value according to the engine speed is provided by the first information D1. The ECU 10-3 operates the engine 23 so that a predetermined output torque is obtained by the second information D2. The ECU 10-2 acquires a value (the first information D1) indicated by the instrument 24 from the bus 2-1 and acquires a detected value (the second information D2) of the output torque of the engine 23 from the bus 2-2. The ECU 10-2 compares the value indicated by the instrument 24 with the detected value of the output torque of the engine 23 and determines that a fraud has occurred when they are outside of a predetermined relationship.

According to third embodiment described above, the ECU 10-1C transmits a message M for the control device to each of the bus 2-1 and the bus 2-2. The ECU 10-4C transmits a message M1 indicating a result of control based on a message M4 transmitted to the bus 2-1 to the bus 2-1. The ECU 10-3 transmits a message M2 indicating a result of control based on a message M3 transmitted to the bus 2-2 to the bus 2-2. The ECU 10-2C receives the message M1 from the bus 2-1, receives the message M2 from the bus 2-2, and performs a comparison on the basis of information included in the message M1 and the message M2 thereby detecting the fraud state in the vehicle and detecting the fraud state in the communication system 1 using a control signal.

Also, according to the third embodiment, the ECU 10-3 provided in the bus 2 receives the above-described control signal and controls the control target 20 corresponding to its own device, thereby detecting the fraud state using a signal transmitted by another ECU 10 via the bus 2 using the above-described control signal.

Also, according to third embodiment, it is possible to detect the fraud state even when items of information to be transmitted to the buses 2 by the ECU 10-1 are different from each other.

Fourth Embodiment

Hereinafter, the fourth embodiment will be described. The fourth embodiment is different from the first embodiment in that an ECU 10-1D transmits signals including the same information to the bus 2-1 and the bus 2-2, the signals transmitted to the two buses 2 are converted, and the ECU 10-2C performs a comparison on the basis of the signals received from a plurality of transmission paths thereof. Hereinafter, these differences will be mainly described.

Figure 23:
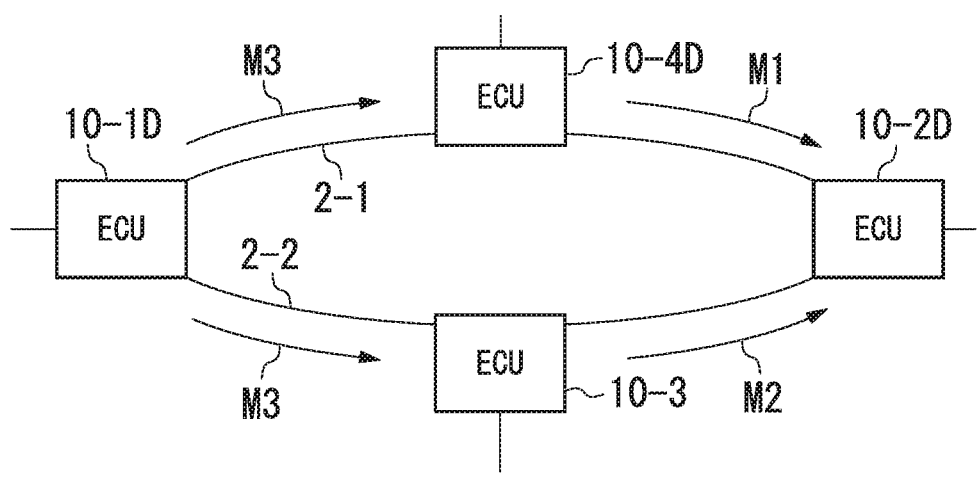
FIG. 23 is a diagram illustrating a configuration of a communication system of a fourth embodiment.
Figure 24:
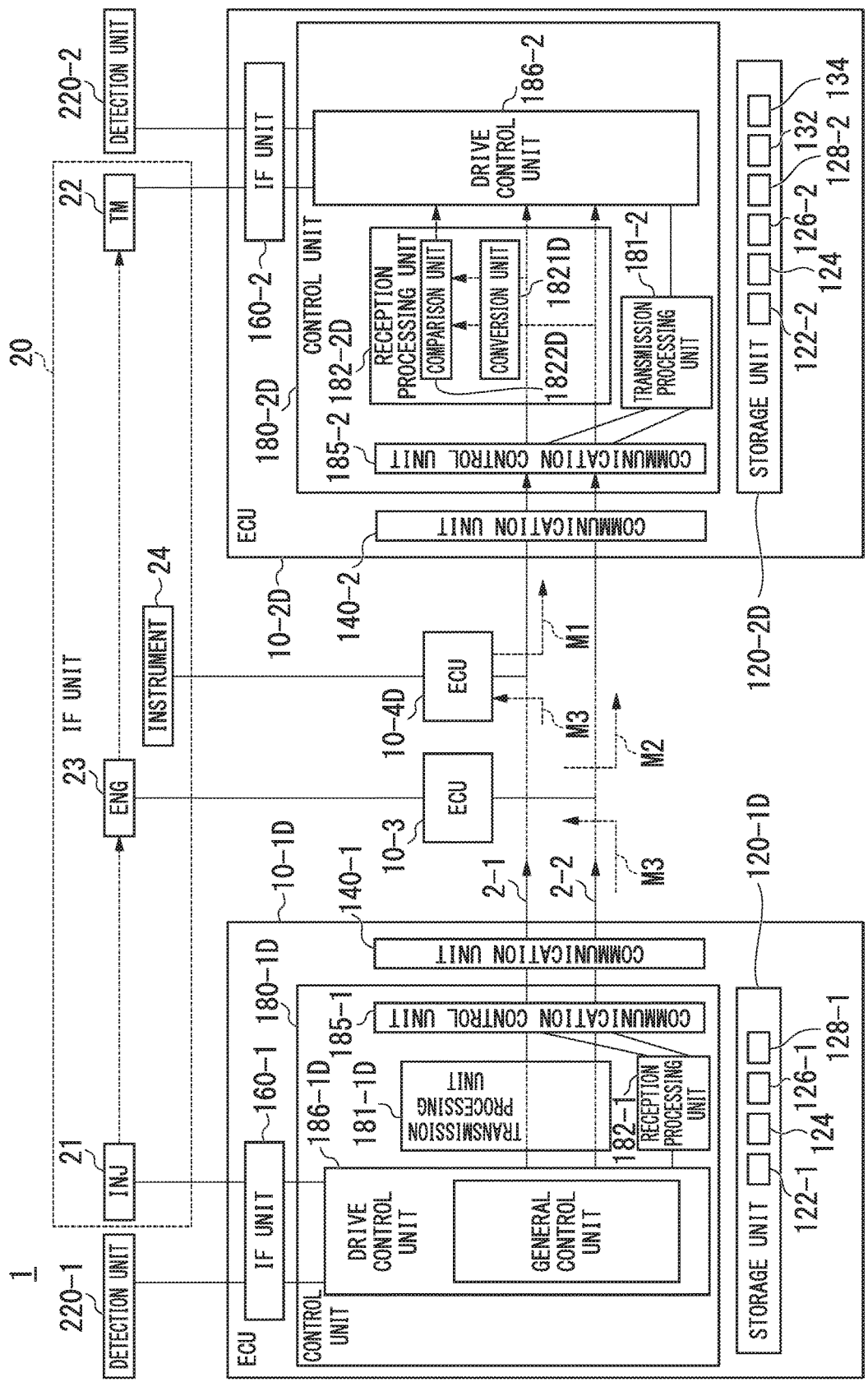
FIG. 24 is a diagram illustrating the configuration of the communication system of the present embodiment.

FIGS. 23 and 24 are diagrams illustrating a configuration of the communication system 1 of the present embodiment. Also, in FIGS. 23 and 24, there are positions at which parts in common with the above-described FIG. 1 are omitted. Also, in FIG. 23, an example of the fraud state detection process when the communication system 1 is in a certain communication state is shown.

The communication system 1 includes an ECU 10-1D, an ECU 10-2D, an ECU 10-3, and an ECU 10-4D.

(ECU 10-1D)

The ECU 10-1D includes, for example, a storage unit 120-1, a communication unit 140-1, an IF unit 160-1, and a control unit 180-1D.

The control unit 180-1D includes a transmission processing unit 181-1D, a reception processing unit 182-1, a communication control unit 185-1, and a drive control unit 186-1D. The drive control unit 186-1D acquires information to be transmitted to another ECU 10 in response to an instruction from the drive control unit 186-1D and transmits a message M to the network NW. For example, the transmission processing unit 181-1D generates a message M3 to be transmitted to the bus 2-1 and a message M3 to be transmitted to the bus 2-2, and notifies the communication control unit 185-1 of a transmission request after the messages M3 are stored in the transmission buffer 126-1. If the message M3 to be transmitted to the bus 2-1 and the message M3 to be transmitted to the bus 2-2 are transmitted to another ECU 10, the transmission processing unit 181-1D performs transmission so that the messages M correspond thereto.

(ECU 10-4D)

Figure 25:
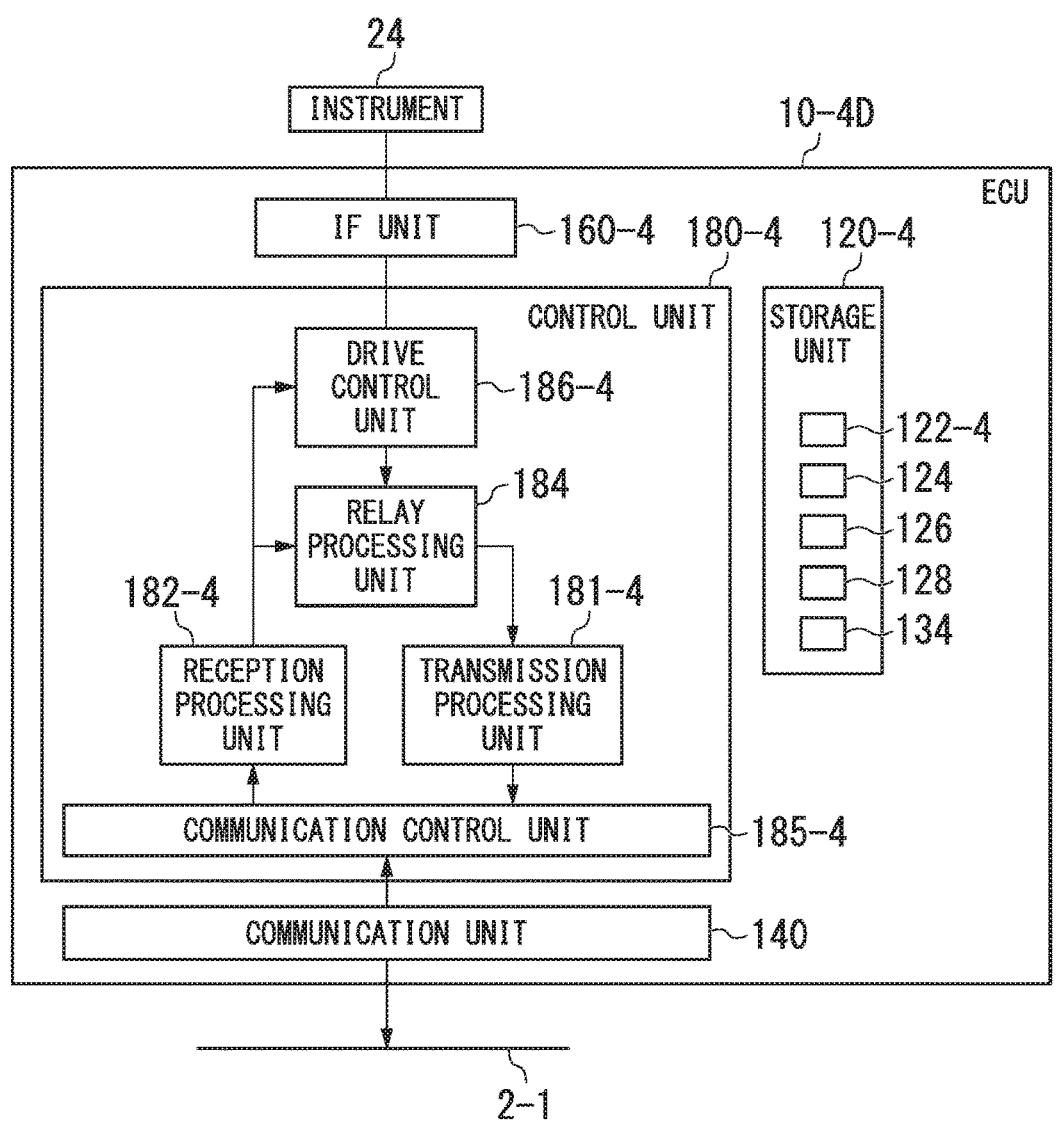
FIG. 25 is a diagram illustrating a configuration example of an ECU of the present embodiment.

FIG. 25 is a diagram illustrating a configuration example of the ECU 10-4D. Parts provided in the ECU 10-4D correspond to those of the above-described ECU 10-4C (FIG. 18).

The storage unit 120-4D includes a conversion rule 134. The conversion rule 134 includes a conversion rule for converting the message M3 to the message M1. For points other than the above for the conversion rule 134, the description of the above-described conversion rule 132 should be referred to.

The control unit 180-4 includes a transmission process unit 181-4, a reception processing unit 182, a relay processing unit 184, a communication control unit 185-4, and a drive control unit 186-4. A detection unit 220 provided in correspondence with the drive control unit 186-4 is absent in the drive control unit 186-4 and a control response value may not be output. The relay processing unit 184 corresponds to the relay processing unit 183 and performs a similar process according to the conversion rule 134. The relay processing unit 184 converts the message M3 into the message M1 and causes the message M1 to be transmitted.

(ECU 10-2D)

Returning to FIG. 24, the ECU 10-2D will be described. The ECU 10-2D includes, for example, a storage unit 120-2D, a communication unit 140-2, an IF unit 160-2, and a control unit 180-2D.

The storage unit 120-2D further includes the conversion rule 134 in addition to the configuration of the above-described storage unit 120-2.

The control unit 180-2D includes a transmission processing unit 181-2, a reception processing unit 182-2D, a communication control unit 185-2, and a drive control unit 186-2. The reception processing unit 182-2D corresponds to the reception processing unit 182-2. The reception processing unit 182-2D of the present embodiment includes a conversion unit 1821D and a comparison unit 1822D. The conversion unit 1821D converts at least one of the first information D1 and the second information D2 which are predetermined according to a predetermined conversion rule. The comparison unit 1822D compares a result after conversion by the conversion unit 1821D with the other information unconverted by the conversion unit 1821D. Alternatively, the comparison unit 1822D compares results after conversion by the conversion unit 1821D with each other. The above-described reception processing unit 182-2 generates estimated information according to the conversion rule 132 from the information included in the received message M, but the reception processing unit 182-2D generates estimated information according to the conversion rule 134 in addition thereto. The reception processing unit 182-2D performs an estimation process using only the conversion rule 132, only the conversion rule 134, or both the conversion rule 132 and the conversion rule 134.

(Fraud State Detection Process)

Next, the fraud state detection process of the communication system 1 will be described with reference to the above-described FIG. 11. In the example shown in the present embodiment, the ECU 10-2D performs the fraud state detection process.

The ECU 10-1D transmits messages M3 including the same information to each of the bus 2-1 and the bus 2-2. The ECU 10-4D controls the instrument 24 on the basis of the message M3 transmitted to the bus 2-1 and transmits the message M1 indicating a result of control to the bus 2-1.

The ECU 10-3 controls the engine 23 on the basis of the message M3 transmitted to the bus 2-2 and transmits the message M2 indicating a result of control to the bus 2-2.

The ECU 10-2D receives the message M1 from the bus 2-1, receives the message M2 from the bus 2-2, and detects the fraud state in the vehicle on the basis of the message M1 and the message M2. The ECU 10-2D performs a comparison on the basis of the first information D1 included in the message M1 and the second information D2 included in the message M2. The ECU 10-2D determines that the state is in a fraud state if a predetermined correlation is not recognized between the first information D1 and the second information D2 from a comparison result.

Also, for an example of the fraud state detection process in the ECU 10-2D, FIG. 19 described above should be referred to.

(Correlation Determination Method in Fraud State Detection Process)

A more specific method of the correlation determination method in the fraud detection process will be described.

Figure 26:
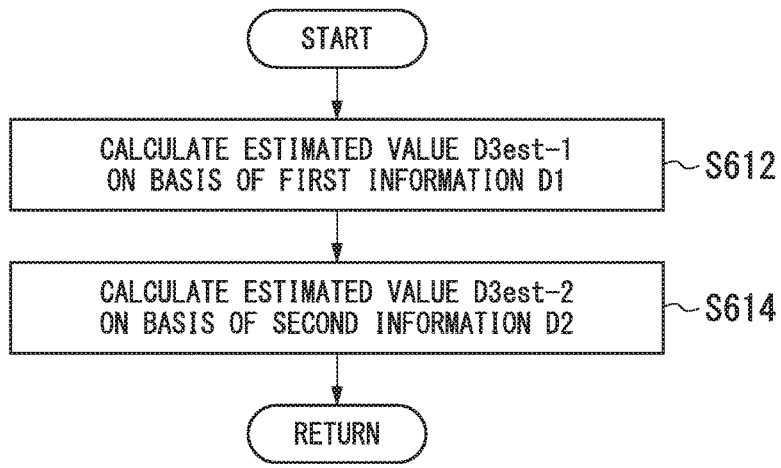
FIG. 26 is a flowchart illustrating an example of the correlation determination process in the fraud state detection process.
Figure 27:
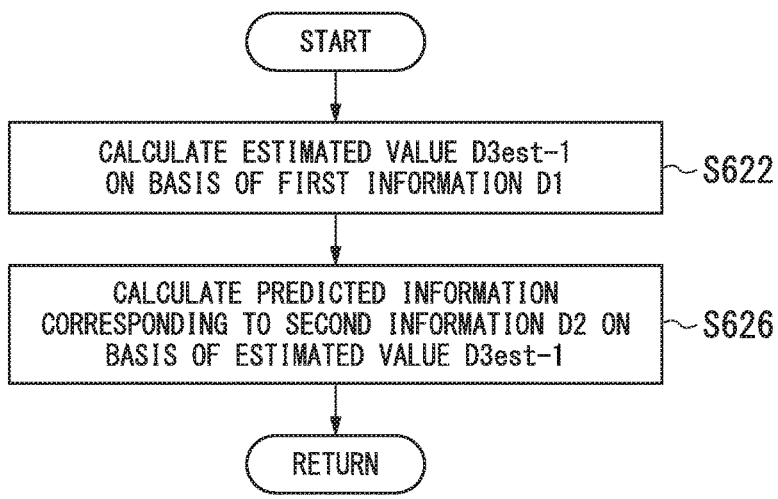
FIG. 27 is a flowchart illustrating an example of the correlation determination process in the fraud state detection process.
Figure 28:
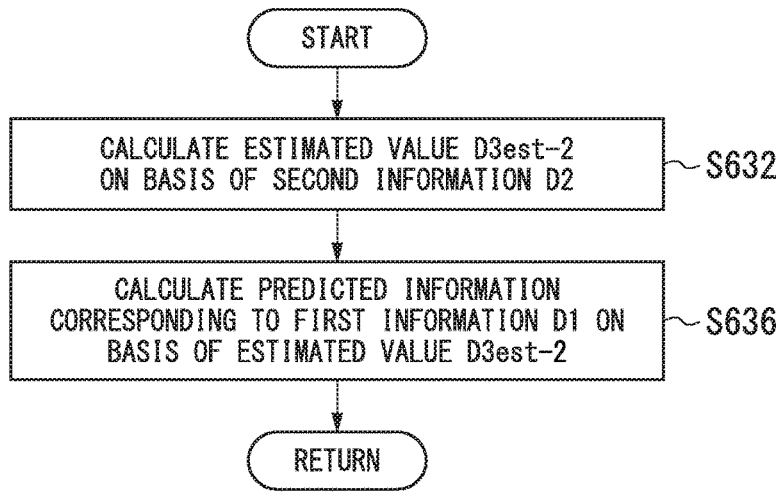
FIG. 28 is a flowchart illustrating an example of the correlation determination process in the fraud state detection process.

FIGS. 26 to 28 are flowcharts illustrating an example of a correlation determination process in the fraud state detection process.

(First Determination Method)

Information to be transmitted to the buses 2 by the ECU 10-1D of the present embodiment includes the same information.

The ECU 10-2D cannot directly receive the message M3 transmitted to the bus 2 by the ECU 10-1D and the receivable message M and its information are as follows. The ECU 10-4D generates the first information D1 by converting the third information D3 included in the message M3 transmitted by the ECU 10-1D and transmits the generated first information D1 as the message M1. The ECU 10-3 generates the second information D2 by converting information D3 included in the message M3 transmitted by the ECU 10-1D and transmits the generated second information D2 as the message M2. The ECU 10-2D obtains the first information D1 and the second information D2 described above by receiving the message M1 and the message M2.

Therefore, the ECU 10-2D estimates information transmitted by the ECU 10-1D using the received information. If the estimated information has a predetermined correlation, the ECU 10-2D determines that there is a correlation in information received by the ECU 10-2D.

An example of the specific process of the first determination method is illustrated in FIG. 26. First, the reception processing unit 182-2D calculates an estimated value of the third information D3 (first original information) (hereinafter referred to as an estimation value D3$est$-1) serving as a basis from which the first information D1 is generated by the ECU 10-4 on basis of the first information D1 (S612). The estimated value D3$est$-1 corresponds to the above-described third information D3. Also, the reception processing unit 182-2D calculates an estimated value of the third information D3 (second original information) (hereinafter referred to as an estimation value D3$est$-2) serving as a basis from which the second information D2 is generated by the ECU 10-3 on the basis of the second information D2 (S614). The estimated value D3$est$-2 corresponds to the above-described third information D3.

The reception processing unit 182-2D compares the estimated value D3$est$-1 with the estimated value D3$est$-2. As described above, the estimated value D3$est$-1 and the estimated value D3$est$-2 are values of the same dimension. The above-described process is an example of when S419 of FIG. 19 described above is selected.

(Second Determination Method)

Next, the second determination method will be described. Although the estimated value D3$est$-1 is compared with the estimated value D3$est$-2 in the above-described example, one estimated value described above is used in the following example. Here, an example in which the estimated value D3$est$-1 related to the ECU 10-4D is used is shown.

In the second determination method, a model in which the estimated value D3$est$-1 related to the ECU 10-4D is designated as input information of the ECU 10-3 is considered. Information serving as a base when the ECU 10-3 generates the second information D2 is information D3. If there is a predetermined correlation between the above-described estimated value D3$est$-1 and the above-described information D3, there is a correlation even in each conversion result when the ECU 10-3 converts the above-described information.

An example of a specific process of the second determination method is illustrated in FIG. 27. First, the reception processing unit 182-2D determines an estimated value D3$est$-1 serving as a basis from which the first information D1 is generated by the ECU 10-4D on the basis of the first information D1 (S622) and calculates a predicted information capable of being generated by the ECU 10-3 on the basis of the estimated value D3$est$-1 (S626). The reception processing unit 182-2D compares the predicted information determined on the basis of the first information D1 with the second information D2. The above-described process is an example of when S417 of FIG. 19 described above is selected.

(Third Determination Method)

Next, the third determination method will be described. As shown in the second determination method, it is possible to use the estimated value of the second original information related to the ECU 10-4D.

In this case, the ECU 10-2D performs the following process.

An example of the specific process of the third determination method is illustrated in FIG. 28. First, the reception processing unit 182-2D determines an estimated value D3$est$-2 serving as a basis from which the second information D2 is generated by the ECU 10-3 on the basis of the second information D2 (S632) and calculates first predicted information capable of being generated by the ECU 10-4D on the basis of the estimated value D3$est$-2 (S636). The reception processing unit 182-2D compares the first predicted information determined on the basis of the second information D2 with the first information D1. The above-described process is an example of when S418 of FIG. 19 described above is selected. The ECU 10-2D performs any one of the above-described three types of determination method. Alternatively, the above-described determination method may be configured to be selected and performed on the basis of setting information.

It is possible to omit a process using the correspondence table 136 in the above-described third embodiment in the communication system 1 of this embodiment.

Next, a specific example of application of the present embodiment will be described. The ECU 10-1 controls the fuel injection device 21. The ECU 10-1 transmits a control instruction value (the first information D1) indicating an engine speed to the bus 2-1 and the bus 2-2. The ECU 10-4D operates the instrument 24 so that an indication value according to the engine speed is provided by the first information D1. The ECU 10-3 operates the engine 23 so that the engine speed indicated by the first information D1 is obtained. The ECU 10-2 acquires a value (the first information D1) indicated by the instrument 24 from the bus 2-1 and acquires a detected value (the second information D2) of an output torque of the engine 23 from the bus 2-2. The ECU 10-2 compares the value indicated by the instrument 24 with the detected value of the output torque of the engine 23 and determines that a fraud has occurred when they are outside of a predetermined relationship.

According to the fourth embodiment described above, the ECU 10-1D transmits a message M3 including common information to each of the bus 2-1 and the bus 2-2. The ECU 10-4D transmits the message M1 indicating a result of control based on a message M3 transmitted to the bus 2-1 to the bus 2-1. The ECU 10-3 transmits a message M2 indicating a result of control based on the message M3 transmitted to the bus 2-2 to the bus 2-2. The ECU 10-2D receives the message M1 from the bus 2-1, receives the message M2 from the bus 2-2, and performs a comparison on the basis of information included in the message M1 and the message M2, thereby detecting the fraud state in the vehicle and detecting the fraud state in the communication system 1 using a control signal.

Also, according to the fourth embodiment, the ECU 10-3 provided in the bus 2 receives the above-described control signal and controls the control target 20 corresponding to its own device, so that another ECU 10 can use a control signal for controlling the control target corresponding to the other ECU 10 in detecting the fraud state via the bus 2.

Also, according to the fourth embodiment, it is possible to simplify a configuration for detecting the fraud state by applying the present invention to the case in which information to be transmitted to the bus 2 by the ECU 10-1D is common.

According to the fourth embodiment, the ECU 10-2D has the same conversion rule 132 as the conversion rule 132 provided in the ECU 10-3.

Also, the ECU 10-2D may perform a conversion process according to the conversion rule 132 on the basis of the first information D1 of the message M1 received from the bus 2-1 to generate an estimated value D2est of the second information D2 included in the message M2 received from the bus 2-2.

In the above-described case, according to the correlation determination process shown in the example of the embodiment, a determination process of comparing the second information D2 with the estimated value D2est can be performed in place of the determination process of comparing the second information D2 with the first information D1. Thereby, in the communication system 1, a comparison can be performed after aligning units of information and a correlation determination is more accurate.

Also, the control unit of each device connected to the network NW may execute the fraud state detection process. Each device described above includes a device such as an ECU 10, a gateway device which mediates communication of the network NW and another network, a general control device which controls communication of the network NW, or a server device. Also, the device such as the gateway device, the general control device, or the server device described above is one form of the ECU 10.

Also, although an example in which the ECU 10-3 different from the ECU 10-1 and the ECU 10-2 converts a control signal received from the bus 2 has been described according to the communication system 1 of the above-described embodiment, at least one of the ECU 10-1 and the ECU 10-2 may perform the conversion process which is performed by the ECU 10-3 in place thereof. For example, it is possible to configure an ECU in which the ECU 10-1 and the ECU 10-3 are integrated in place of the ECU 10-1 and configure an ECU in which the ECU 10-2 and the ECU 10-3 are integrated in place of the ECU 10-2.

Also, although an example in which the illustrated ECUs 10-3 and 10-4 are connected to one bus 2 via the communication unit 140 is shown, the communication unit 140 may include a plurality of CAN transceivers and may be configured to be connected to different buses 2.

For example, although the ECU 10-3 and the ECU 10-4 transmit generated signals to transmission paths receiving signals serving as bases from which the signals are generated, i.e., the bus 2-1 in the ECU 10-3 and the bus 2-2 in the ECU 10-4 in the above-described examples, the ECU 10-2 may be connected to a transmission path different from the bus 2-1 or the bus 2-2.

FIGS. 29 to 32 are diagrams illustrating examples of a network NW shown as the modified example.

Figure 29:
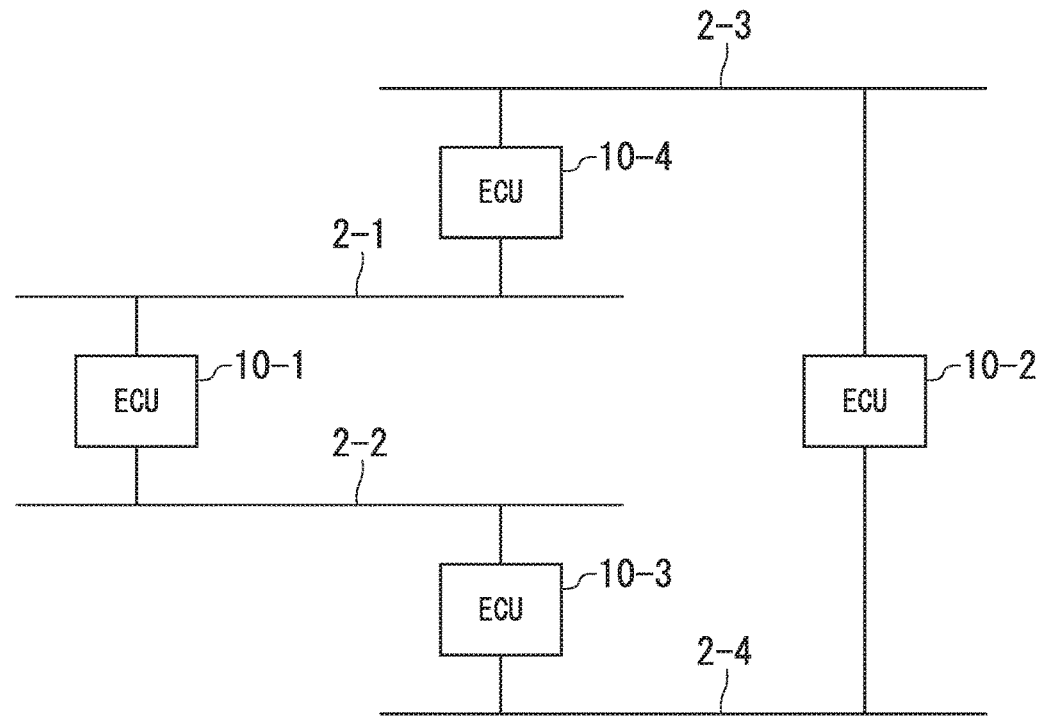
FIG. 29 is a diagram illustrating an example of a configuration of a network as a modified example.
Figure 30:
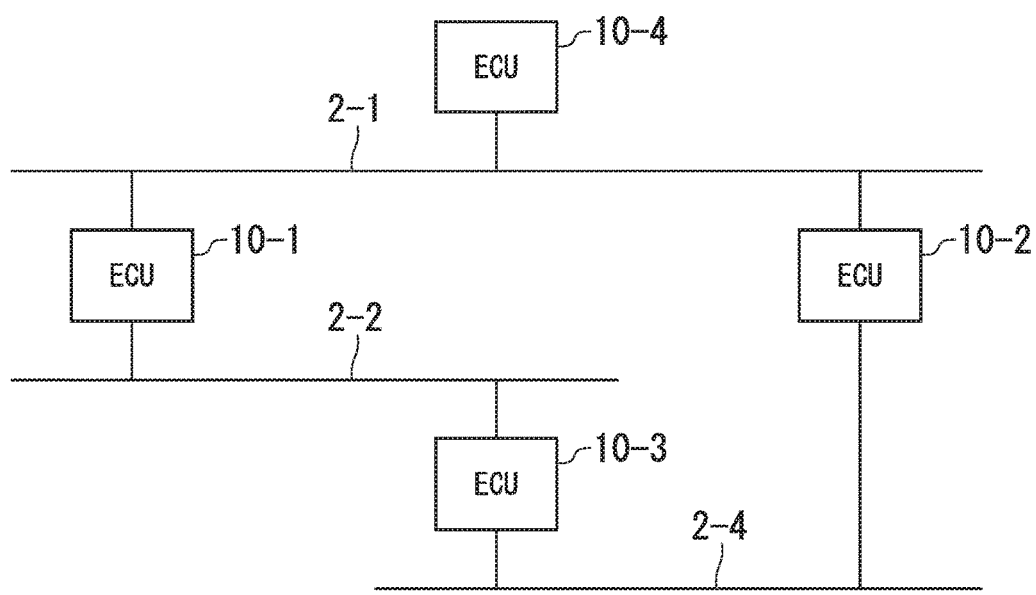
FIG. 30 is a diagram illustrating an example of a configuration of a network as a modified example.
Figure 31:
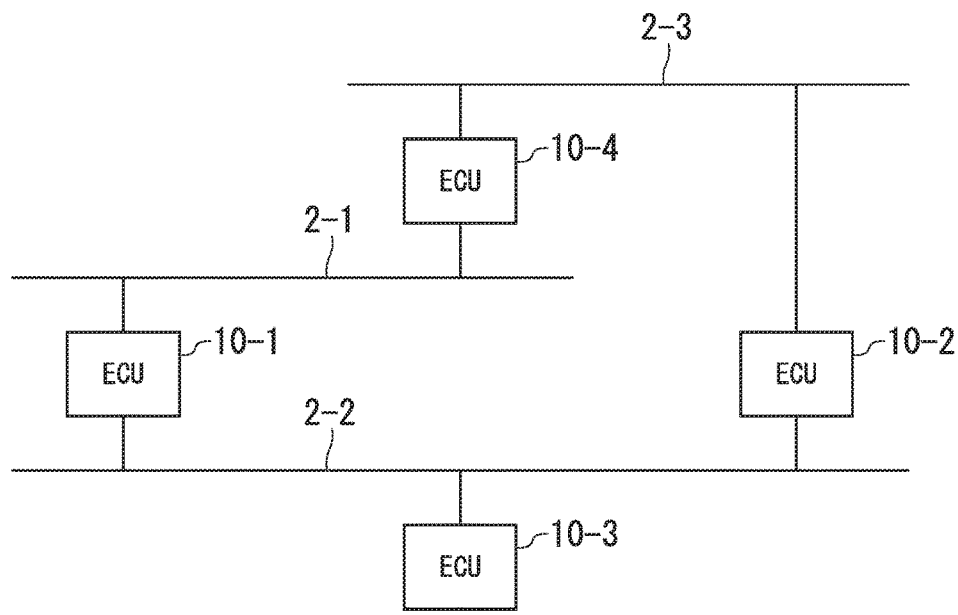
FIG. 31 is a diagram illustrating an example of a configuration of a network as a modified example.
Figure 32:
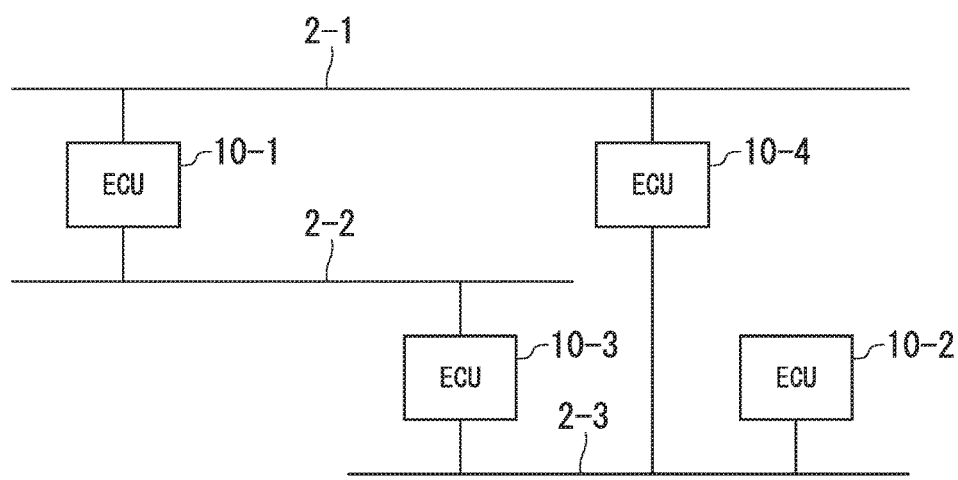
FIG. 32 is a diagram illustrating an example of a configuration of a network as a modified example.

For example, if the ECU 10-2 is connected to a bus 2-3 (the third transmission path) or a bus 2-4 (the fourth transmission path) serving as the transmission path different from the bus 2-1 or the bus 2-2 as in the first modified example illustrated in FIG. 29, the ECU 10-3 and the ECU 10-4 may transmit each generated signal to the bus 2-3 or the bus 2-4. In this case, the ECU 10-2 performs the above-described fraud state detection process using the signal received from the bus 2-3 or the bus 2-4. For example, an example shown in the above-described embodiment is an example of a configuration of the network NW when the bus 2-3 is the same as the bus 2-1 and the bus 2-4 is the same as the bus 2-2.

Further, the communication system 1 may configure the network NW as in the following modified example. In a second modified example illustrated in FIG. 30, the bus 2-1 and the bus 2-3 are configured as the same transmission path and the bus 2-2 and the bus 2-4 are configured as different transmission paths. In a third modified example illustrated in FIG. 31, the bus 2-2 and the bus 2-4 are configured as the same transmission path and the bus 2-1 and the bus 2-3 are configured as different transmission paths. In a fourth modified example illustrated in FIG. 32, the bus 2-3 and the bus 2-4 are configured as the same transmission path.

In the communication system 1 using the network NW shown in each modified example described above, the ECU 10-1 may be configured to transmit a signal to which an identification code indicating that a transmission source is its own device is added to the bus 2-1 and the bus 2-2 and the ECU 10-3 or the ECU 10-4 may be further configured to discriminate whether an identification code indicating that the transmission source is the ECU 10-1 is added to a received signal and perform the above-described control for an in-vehicle device if the identification code indicating that the transmission source is the ECU 10-1 is added to the received signal. According to this configuration, it is possible to further simplify the detection of the fraud state if there is a device spoofing the ECU 10-1.

Also, the bus 2-1, the bus 2-2, the bus 2-3, and the bus 2-4 in the above description are an example of a transmission path constituting the network NW. The transmission path of the present embodiment may be configured in units of cables (transmission lines) connected to the ECU 10 or a range including different cables and a specific device which performs a relay operation between the cables may be configured as one transmission path. The above-described specific device may or may not be the ECU 10. The above-described device relays the signal between different cables, and may transparently relay a message, as in, for example, a gateway device in a CAN, a bridge device, or the like.

According to the above-described modified examples, it is possible to have an effect similar to that of the above-described embodiment even when networks NW having various configurations are used.

According to at least one embodiment described above, the communication system 1 includes the ECU 10-1, the ECU 10-2, and the ECU 10-3. The ECU 10-1 transmits a signal to each of the bus 2-1 and the bus 2-2 provided inside the vehicle. The ECU 10-3 controls an in-vehicle device on the basis of the signal transmitted to the bus 2-2 and transmits a signal indicating a result of control to the bus 2-2 or the bus 2-3. The ECU 10-2 performs a comparison on the basis of the first information included in the signal received from the bus 2-1 and the second information included in the signal received from the bus 2-2 or the bus 2-3, thereby detecting the fraud state in the vehicle and protecting the control device from the fraudulent behavior in the network according to a simpler configuration.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication system, comprising:
a first device configured to transmit a signal to each of a first transmission path and a second transmission path provided within a vehicle;
a control device configured to control an in-vehicle device on the basis of the signal transmitted to the second transmission path and transmit a signal indicating a result of control to a third transmission path; and
a second device configured to detect a fraud state in the vehicle by performing a comparison on the basis of first information included in the signal received from the first transmission path and second information included in the signal received from the third transmission path.

2. The communication system according to claim 1,
wherein the first device transmits a signal including predetermined third information to the second transmission path and transmits a signal including the first information different from the third information to the first transmission path,
wherein the control device converts the third information into the second information, and
wherein the second device determines that a state is in the fraud state when the first information and the second information are different beyond a predetermined degree.

3. The communication system according to claim 1,
wherein the first device transmits a signal including common information to the first transmission path and the second transmission path, and
wherein the second device generates predicted information by predicting original information serving as a basis from which the second information is generated through conversion by the control device on the basis of the second information, and determines that the state is in the fraud state at least when the first information and the predicted information are different beyond a predetermined degree or when information obtained by performing the same conversion as the conversion on the first information and the second information are different beyond a predetermined degree.

4. A communication system, comprising:
a first device configured to transmit a signal for a control device to each of a first transmission path and a second transmission path provided within a vehicle;
a first control device configured to control an in-vehicle device on the basis of the signal transmitted to the first transmission path and transmit a first signal indicating a result of control to a third transmission path;
a second control device configured to control the in-vehicle device on the basis of the signal transmitted to the second transmission path and transmit a second signal indicating a result of control to a fourth transmission path; and
a second device configured to detect a fraud state in the vehicle by performing a comparison on the basis of first information included in the first signal received from the third transmission path and second information included in the second signal received from the fourth transmission path.

5. The communication system according to claim 4,
wherein the first device transmits a signal including common information to the first transmission path and the second transmission path, and
wherein the second device determines that the state is in the fraud state
at least when an estimated value of first original information serving as a basis from which the first information is generated by the first control device is determined on the basis of the first information, second predicted information capable of being generated by the second control device is determined on the basis of the estimated value of the first original information, and the second information and the second predicted information are different beyond a predetermined degree,
when an estimated value of second original information serving as a basis from which the second information is generated by the second control device is determined on the basis of the second information, first predicted information capable of being generated by the first control device is determined on the basis of the estimated value of the second original information, and the first information and the first predicted information are different beyond a predetermined degree, or
when the estimated value of the first original information serving as the basis from which the first information is generated by the first control device is determined on the basis of the first information, the estimated value of the second original information serving as the basis from which the second information is generated by the second control device on the basis of the second information is determined, and the first original information and the second original information are different beyond a predetermined degree.

6. The communication system according to claim 4,
wherein the first device and the second device have a correspondence table in which other information is defined in a predetermined range if the first device determines third information to be transmitted to the first transmission path or fourth information to be transmitted to the second transmission path, and
wherein the second device determines that the state is in the fraud state
at least when an estimated value of first original information serving as a basis from which the first information is generated by the first control device is determined on the basis of the first information, a converted value obtained by referring to the correspondence table is determined on the basis of the estimated value of the first original information, second predicted information capable of being acquired by the second control device performing conversion is determined on the basis of the determined converted value, and the second information and the second predicted information are different beyond a predetermined degree,
when an estimated value of second original information serving as a basis from which the second information is generated by the second control device is determined on the basis of the second information, a converted value obtained by referring to the correspondence table is determined on the basis of the estimated value of the second original information, first predicted information capable of being acquired by the first control device performing conversion is determined on the basis of the determined converted value, and the first information and the first predicted information are different beyond a predetermined degree, or when the estimated value of the first original information serving as the basis from which the first information is generated by the first control device is determined on the basis of the first information, the estimated value of the second original information serving as the basis from which the second information is generated by the second control device on the basis of the second information is determined, and the first original information and the second original information are not in a correspondence relationship of the correspondence table.

7. The communication system according to claim 4, wherein the fourth transmission path is the same as the second transmission path.

8. The communication system according to claim 4, wherein the third transmission path is the same as the fourth transmission path.

9. The communication system according to claim 1, wherein the third transmission path is the same as the first transmission path.

10. The communication system according to claim 1, wherein at least a signal transmitted by the first device includes transmission source information of the signal.

11. The communication system according to claim 1, wherein the second device performs the comparison after aligning dimensions of information to be compared.

12. The communication system according to claim 1, wherein the control device performs conversion into the second information by combining other additional information.

13. The communication system according to claim 1, wherein the second device determines that the state is in the fraud state if a predetermined correlation is not recognized between the first information included in the received signal and the second information included in the received signal.

14. The communication system according to claim 1, wherein the second device controls a function of the vehicle to be executed by the in-vehicle device corresponding to the second device on the basis of one or both of the first information and the second information.

15. The communication system according to claim 1, wherein hardware which executes a function of the vehicle and a sensor which acquires a control response of the hardware are associated in the control device, and wherein the control device designates the control response acquired by the sensor by controlling the hardware with a control instruction value included in the signal received from the second transmission path as the second information.

16. The communication system according to claim 15, wherein the hardware includes any of a drive device, a transmission, and an instrument.

17. The communication system according to claim 1, wherein the second device determines that the state is in the fraud state by determining that a fraud device spoofing the first device exists.

18. The communication system according to claim 1, wherein at least one of the first device, the second device, and the control device has a function of relaying communication between two or more different transmission paths.

19. The communication system according to claim 1, wherein the control device transmits information indicating a malfunction when a malfunction occurs in the control device, and wherein the second device determines that the state is in the fraud state by determining that the malfunction has occurred in the control device if the information indicating the malfunction is received and determining that a fraud device spoofing the first device exists if the information indicating the malfunction is not received.

20. A control device in the communication system according to claim 1, wherein a rule for generating the second information is shared with the first device or the second device.

* * * * *